United States Patent
Bachman et al.

(10) Patent No.: US 9,558,278 B2
(45) Date of Patent: Jan. 31, 2017

(54) INTEGRATED CONTENT RECOMMENDATION

(71) Applicant: APPLE INC., Cupertino, CA (US)

(72) Inventors: William M. Bachman, San Jose, CA (US); Brian R. Frick, Gaithersburg, MD (US); Timothy B. Martin, Morgan Hill, CA (US); Jeffrey L. Robbin, Los Altos, CA (US); Christopher J. Sanders, San Jose, CA (US)

(73) Assignee: APPLE INC., Cupertino, CA (US)

( * ) Notice: Subject to any disclaimer, the term of this patent is extended or adjusted under 35 U.S.C. 154(b) by 126 days.

(21) Appl. No.: 13/890,888

(22) Filed: May 9, 2013

(65) Prior Publication Data
US 2014/0075313 A1    Mar. 13, 2014

Related U.S. Application Data

(60) Provisional application No. 61/699,788, filed on Sep. 11, 2012.

(51) Int. Cl.
 G06F 17/30    (2006.01)
 G06F 3/0484   (2013.01)
 G06Q 30/06    (2012.01)

(52) U.S. Cl.
 CPC ....... *G06F 17/30867* (2013.01); *G06F 3/0484* (2013.01); *G06Q 30/0631* (2013.01);
 (Continued)

(58) Field of Classification Search
 CPC .................. G06F 17/30058; G06F 17/30985; G06F 17/30864; G06F 17/30772; G06F 17/30867; G06Q 30/0641
 (Continued)

(56) References Cited

U.S. PATENT DOCUMENTS 4,464,652 A    8/1984  Lapson et al.
4,555,775 A    11/1985 Pike
(Continued)

FOREIGN PATENT DOCUMENTS

EP    0483777       5/1992
EP    0514307 A3    11/1992
(Continued)

OTHER PUBLICATIONS

Viticci, "Web-based, Social iTunes Store Launching Next Week?", Aug. 26, 2010, <URL: http://www.macstories.net/news/web-based-social-itunes-store-launching-next-week/>, p. 1-4.*

(Continued)

*Primary Examiner* — Ajay Bhatia
*Assistant Examiner* — Mong-Shune Chung
(74) *Attorney, Agent, or Firm* — Morgan, Lewis & Bockius LLP

(57) ABSTRACT

Embodiments of the present disclosure relate to devices and methods for providing integrated content recommendations in a graphical user-interface GUI). Specifically, embodiments of the present disclosure employ a recommendation request from a client running a GUI for content recommendations formatted to fit within the GUI. An external component determines the recommendations, formats the recommendations to match a layout/look and feel of the GUI and the formatted recommendations are presented in the GUI as an integrated component of the GUI.

9 Claims, 30 Drawing Sheets

(52) U.S. Cl.
CPC ... *G06Q 30/0643* (2013.01); *G06F 17/30772* (2013.01); *G06Q 30/0641* (2013.01)

(58) Field of Classification Search
USPC .................. 707/749, 780; 705/27.1; 715/716
See application file for complete search history.

(56) References Cited

U.S. PATENT DOCUMENTS

| | | |
|---|---|---|
| 4,653,020 A | 3/1987 | Cheselka et al. |
| 4,688,167 A | 8/1987 | Agarwal |
| 4,689,737 A | 8/1987 | Grant |
| 4,712,191 A | 12/1987 | Penna |
| RE32,632 E | 3/1988 | Atkinson |
| 4,769,636 A | 9/1988 | Iwami et al. |
| 4,780,709 A | 10/1988 | Randall |
| 4,783,648 A | 11/1988 | Homma et al. |
| 4,819,189 A | 4/1989 | Kikuchi et al. |
| 4,831,556 A | 5/1989 | Oono |
| 4,862,389 A | 8/1989 | Takagi |
| 4,899,136 A | 2/1990 | Beard et al. |
| 5,008,853 A | 4/1991 | Bly et al. |
| 5,040,131 A | 8/1991 | Torres |
| 5,060,170 A | 10/1991 | Bourgeois et al. |
| 5,107,443 A | 4/1992 | Smith et al. |
| 5,140,677 A | 8/1992 | Fleming et al. |
| 5,140,678 A | 8/1992 | Torres |
| 5,146,556 A | 9/1992 | Hullot et al. |
| 5,202,828 A | 4/1993 | Vertelney et al. |
| 5,293,476 A | 3/1994 | Wolber et al. |
| 5,305,435 A | 4/1994 | Bronson |
| 5,313,575 A | 5/1994 | Beethe |
| 5,325,481 A | 6/1994 | Hunt |
| 5,343,409 A | 8/1994 | Satterfield et al. |
| 5,347,628 A | 9/1994 | Brewer et al. |
| 5,371,844 A | 12/1994 | Andrew et al. |
| 5,384,911 A | 1/1995 | Bloomfield |
| 5,386,564 A | 1/1995 | Shearer et al. |
| 5,412,776 A | 5/1995 | Bloomfield et al. |
| 5,422,993 A | 6/1995 | Fleming |
| 5,428,734 A | 6/1995 | Haynes et al. |
| 5,438,662 A | 8/1995 | Randall |
| 5,442,795 A | 8/1995 | Levine et al. |
| 5,546,520 A | 8/1996 | Cline et al. |
| 5,546,527 A | 8/1996 | Fitzpatrick et al. |
| 5,579,469 A | 11/1996 | Pike |
| 5,583,984 A | 12/1996 | Conrad et al. |
| 5,598,524 A | 1/1997 | Johnston, Jr. et al. |
| 5,638,504 A | 6/1997 | Scott et al. |
| 5,638,505 A | 6/1997 | Hemenway et al. |
| 5,652,876 A | 7/1997 | Ashe et al. |
| 5,657,049 A | 8/1997 | Ludolph et al. |
| 5,657,463 A | 8/1997 | Bingham |
| 5,680,562 A | 10/1997 | Conrad et al. |
| 5,714,971 A | 2/1998 | Shalit et al. |
| 5,724,532 A | 3/1998 | Thomson |
| 5,737,737 A | 4/1998 | Hikida et al. |
| 5,742,286 A | 4/1998 | Kung et al. |
| 5,745,096 A | 4/1998 | Ludolph et al. |
| 5,745,111 A | 4/1998 | Cline et al. |
| 5,751,287 A | 5/1998 | Hahn et al. |
| 5,754,174 A | 5/1998 | Carpenter et al. |
| 5,754,178 A | 5/1998 | Johnston, Jr. et al. |
| 5,760,775 A | 6/1998 | Sklut et al. |
| 5,767,834 A | 6/1998 | Vouri et al. |
| 5,771,032 A | 6/1998 | Cline et al. |
| 5,801,702 A | 9/1998 | Dolan et al. |
| 5,825,348 A | 10/1998 | Ludolph et al. |
| 5,825,349 A | 10/1998 | Meier et al. |
| 5,835,094 A | 11/1998 | Ermel et al. |
| 5,886,697 A | 3/1999 | Naughton et al. |
| 5,956,030 A | 9/1999 | Conrad et al. |
| 5,999,178 A | 12/1999 | Hwang et al. |
| 6,034,621 A | 3/2000 | Kaufman |
| 6,061,061 A | 5/2000 | Conrad et al. |
| 6,097,389 A | 8/2000 | Morris et al. |
| 6,121,967 A | 9/2000 | Foster et al. |
| 6,133,898 A | 10/2000 | Ludolph et al. |
| 6,147,687 A | 11/2000 | Wanderski |
| 6,177,935 B1 | 1/2001 | Munn |
| 6,188,404 B1 | 2/2001 | Rekimoto |
| 6,195,094 B1 | 2/2001 | Celebiler |
| 6,208,344 B1 | 3/2001 | Holzman et al. |
| 6,225,920 B1 | 5/2001 | Dayle |
| 6,252,597 B1 | 6/2001 | Lokuge |
| 6,295,541 B1 | 9/2001 | Bodnar et al. |
| 6,307,545 B1 | 10/2001 | Conrad et al. |
| 6,310,633 B1 | 10/2001 | Graham |
| 6,317,739 B1 | 11/2001 | Hirata et al. |
| 6,335,742 B1 | 1/2002 | Takemoto |
| 6,341,280 B1 | 1/2002 | Glass et al. |
| 6,356,915 B1 | 3/2002 | Chtchetkine et al. |
| 6,356,971 B1 | 3/2002 | Katz et al. |
| 6,363,400 B1 | 3/2002 | Chtchetkine et al. |
| 6,411,311 B1 | 6/2002 | Rich et al. |
| 6,430,576 B1 | 8/2002 | Gates et al. |
| 6,433,801 B1 | 8/2002 | Moon et al. |
| 6,470,341 B1 | 10/2002 | Rekimoto |
| 6,496,206 B1 | 12/2002 | Mernyk et al. |
| 6,546,393 B1 | 4/2003 | Khan |
| 6,571,245 B2 | 5/2003 | Huang et al. |
| 6,590,568 B1 | 7/2003 | Astala et al. |
| 6,636,250 B1 | 10/2003 | Gasser |
| 6,642,944 B2 | 11/2003 | Conrad et al. |
| 6,664,983 B2 | 12/2003 | Ludolph |
| 6,691,138 B1 | 2/2004 | Kirkpatrick et al. |
| 6,711,291 B1 | 3/2004 | Stubler et al. |
| 6,741,996 B1 | 5/2004 | Brechner et al. |
| 6,750,886 B1 | 6/2004 | Bergstedt |
| 6,751,604 B2 | 6/2004 | Barney et al. |
| 6,784,925 B1 | 8/2004 | Tomat et al. |
| 6,823,344 B1 | 11/2004 | Isensee et al. |
| 6,823,348 B2 | 11/2004 | Benayoun et al. |
| 6,859,210 B2 | 2/2005 | Luo et al. |
| 6,910,052 B2 | 6/2005 | Gates et al. |
| 6,915,489 B2 | 7/2005 | Gargi |
| 6,924,827 B1 | 8/2005 | Gulati et al. |
| 6,928,621 B2 | 8/2005 | Conrad et al. |
| 6,956,562 B1 | 10/2005 | O'Hara et al. |
| 6,966,033 B1 | 11/2005 | Gasser et al. |
| 7,089,256 B2 | 8/2006 | Smialek |
| 7,096,454 B2 | 8/2006 | Damm et al. |
| 7,117,453 B2 | 10/2006 | Drucker et al. |
| 7,120,735 B1 | 10/2006 | Summers et al. |
| 7,149,729 B2 | 12/2006 | Kaasten et al. |
| 7,162,466 B2 | 1/2007 | Kaasten et al. |
| 7,171,468 B2 | 1/2007 | Yeung et al. |
| 7,293,242 B2 | 11/2007 | Cossey et al. |
| 7,320,109 B1 | 1/2008 | Zeevi et al. |
| 7,334,190 B2 | 2/2008 | Wierowski |
| 7,337,409 B2 | 2/2008 | Doblmayr et al. |
| 7,346,766 B2 | 3/2008 | Mackin et al. |
| 7,353,232 B2 | 4/2008 | Kalucha et al. |
| 7,434,170 B2 | 10/2008 | Novak et al. |
| 7,461,346 B2 | 12/2008 | Fildebrandt |
| 7,472,350 B2 | 12/2008 | Hintermeister et al. |
| 7,496,583 B2 | 2/2009 | Moore et al. |
| 7,549,126 B2 | 6/2009 | Conrad et al. |
| 7,565,618 B2 | 7/2009 | Sheasby et al. |
| 7,607,102 B2 | 10/2009 | Ording et al. |
| 7,665,028 B2 | 2/2010 | Cummins et al. |
| 7,739,604 B1 | 6/2010 | Lyons et al. |
| 7,788,579 B2 | 8/2010 | Berkner et al. |
| 7,956,845 B2 | 6/2011 | Lee |
| 7,958,119 B2 | 6/2011 | Eggink et al. |
| 8,050,496 B2 | 11/2011 | Pan et al. |
| 8,181,119 B1 | 5/2012 | Ording |
| 8,589,492 B2 | 11/2013 | Scholz |
| 8,645,489 B1 | 2/2014 | Riggins et al. |
| 8,650,500 B2 | 2/2014 | Soderberg et al. |
| 2001/0018715 A1 | 8/2001 | Stern et al. |
| 2001/0024212 A1 | 9/2001 | Ohnishi |
| 2001/0042042 A1 | 11/2001 | Stokes et al. |
| 2002/0018051 A1 | 2/2002 | Singh |
| 2002/0059288 A1 | 5/2002 | Yagi et al. |

(56) References Cited

U.S. PATENT DOCUMENTS

| | | |
|---|---|---|
| 2002/0075312 A1 | 6/2002 | Amadio et al. |
| 2002/0075330 A1 | 6/2002 | Rosenzweig et al. |
| 2002/0091697 A1 | 7/2002 | Huang et al. |
| 2002/0097277 A1 | 7/2002 | Pitroda |
| 2002/0107892 A1 | 8/2002 | Chittu et al. |
| 2002/0154176 A1 | 10/2002 | Barksdale et al. |
| 2002/0161777 A1 | 10/2002 | Smialek |
| 2002/0196271 A1 | 12/2002 | Windl et al. |
| 2002/0198909 A1 | 12/2002 | Huynh et al. |
| 2003/0007007 A1 | 1/2003 | Hinegardner et al. |
| 2003/0050713 A1 | 3/2003 | Piersanti et al. |
| 2003/0063126 A1 | 4/2003 | Yanchar et al. |
| 2003/0069931 A1 | 4/2003 | Omura et al. |
| 2003/0076322 A1 | 4/2003 | Ouzts et al. |
| 2003/0079038 A1 | 4/2003 | Robbin et al. |
| 2003/0081011 A1 | 5/2003 | Sheldon et al. |
| 2003/0084096 A1 | 5/2003 | Starbuck et al. |
| 2003/0093466 A1 | 5/2003 | Jarman et al. |
| 2003/0107601 A1 | 6/2003 | Ryzhov |
| 2003/0126136 A1 | 7/2003 | Omoigui |
| 2003/0158975 A1 | 8/2003 | Frank et al. |
| 2003/0160825 A1 | 8/2003 | Weber |
| 2003/0184587 A1 | 10/2003 | Ording et al. |
| 2003/0190590 A1 | 10/2003 | Lumsden et al. |
| 2003/0222913 A1 | 12/2003 | Mattila et al. |
| 2003/0222915 A1 | 12/2003 | Marion et al. |
| 2004/0004638 A1 | 1/2004 | Babaria |
| 2004/0021643 A1 | 2/2004 | Hoshino et al. |
| 2004/0044723 A1 | 3/2004 | Bell et al. |
| 2004/0056839 A1 | 3/2004 | Yoshihara |
| 2004/0070608 A1 | 4/2004 | Saka |
| 2004/0095390 A1 | 5/2004 | Arning et al. |
| 2004/0119763 A1 | 6/2004 | Mizobuchi et al. |
| 2004/0177319 A1 | 9/2004 | Horn |
| 2004/0189695 A1 | 9/2004 | Kurtz et al. |
| 2004/0205711 A1 | 10/2004 | Ishimitsu et al. |
| 2004/0220899 A1 | 11/2004 | Barney et al. |
| 2005/0050301 A1 | 3/2005 | Whittle et al. |
| 2005/0071780 A1 | 3/2005 | Muller et al. |
| 2005/0076305 A1 | 4/2005 | Hintermeister et al. |
| 2005/0080807 A1 | 4/2005 | Beilinson et al. |
| 2005/0097477 A1 | 5/2005 | Camara et al. |
| 2005/0108297 A1 | 5/2005 | Rollin et al. |
| 2005/0132304 A1 | 6/2005 | Guido et al. |
| 2005/0165825 A1 | 7/2005 | Turski et al. |
| 2005/0188174 A1 | 8/2005 | Guzak et al. |
| 2005/0197961 A1* | 9/2005 | Miller ............... G06F 17/30029 705/52 |
| 2005/0246313 A1 | 11/2005 | Turski et al. |
| 2005/0246637 A1 | 11/2005 | Knight et al. |
| 2005/0246640 A1 | 11/2005 | Lacy |
| 2005/0246721 A1 | 11/2005 | Scholz |
| 2005/0275636 A1 | 12/2005 | Dehlin et al. |
| 2006/0036568 A1 | 2/2006 | Moore et al. |
| 2006/0070007 A1 | 3/2006 | Cummins et al. |
| 2006/0146765 A1 | 7/2006 | Van De Sluis et al. |
| 2006/0174216 A1 | 8/2006 | Peterson et al. |
| 2006/0195462 A1* | 8/2006 | Rogers .............. G06F 17/30766 |
| 2006/0259875 A1 | 11/2006 | Collins et al. |
| 2006/0282790 A1 | 12/2006 | Matthews et al. |
| 2006/0294476 A1 | 12/2006 | Buckley |
| 2007/0038610 A1 | 2/2007 | Omoigui |
| 2007/0081197 A1 | 4/2007 | Omoigui |
| 2007/0088672 A1 | 4/2007 | Kaasten et al. |
| 2007/0168388 A1 | 7/2007 | Plastina et al. |
| 2007/0186241 A1 | 8/2007 | Sugimoto et al. |
| 2007/0256009 A1 | 11/2007 | Jung |
| 2008/0036743 A1 | 2/2008 | Westerman et al. |
| 2008/0052371 A1* | 2/2008 | Partovi ................. G06Q 10/10 709/217 |
| 2008/0120501 A1 | 5/2008 | Jannink et al. |
| 2008/0177640 A1 | 7/2008 | Gokturk et al. |
| 2008/0189656 A1 | 8/2008 | Abanami et al. |
| 2008/0227440 A1 | 9/2008 | Settepalli |
| 2009/0049082 A1* | 2/2009 | Slaney et al. ............ 707/103 R |
| 2009/0150388 A1 | 6/2009 | Roseman et al. |
| 2009/0178008 A1 | 7/2009 | Herz et al. |
| 2010/0042654 A1 | 2/2010 | Heller et al. |
| 2010/0076983 A1* | 3/2010 | Gates et al. .................. 707/749 |
| 2010/0088605 A1 | 4/2010 | Livshin et al. |
| 2010/0092085 A1 | 4/2010 | Marchesotti |
| 2010/0185671 A1* | 7/2010 | Burba et al. .................. 707/780 |
| 2010/0246591 A1 | 9/2010 | Gobriel et al. |
| 2011/0216966 A1 | 9/2011 | Cok et al. |
| 2011/0234613 A1 | 9/2011 | Hanson et al. |
| 2011/0246939 A1 | 10/2011 | Kasahara et al. |
| 2011/0252346 A1 | 10/2011 | Chaudhri |
| 2011/0252349 A1 | 10/2011 | Chaudhri |
| 2011/0252350 A1 | 10/2011 | Chaudhri |
| 2011/0252372 A1 | 10/2011 | Chaudhri |
| 2011/0252373 A1 | 10/2011 | Chaudhri |
| 2011/0252374 A1 | 10/2011 | Chaudhri |
| 2011/0252375 A1 | 10/2011 | Chaudhri |
| 2011/0265035 A1 | 10/2011 | Lepage et al. |
| 2012/0027294 A1 | 2/2012 | Krolczyk et al. |
| 2012/0030005 A1 | 2/2012 | Gupta |
| 2012/0036139 A1* | 2/2012 | Okamoto et al. ............. 707/749 |
| 2012/0054666 A1 | 3/2012 | Baird-Smith et al. |
| 2012/0072832 A1 | 3/2012 | Tanaka |
| 2012/0143718 A1 | 6/2012 | Graham et al. |
| 2012/0299942 A1 | 11/2012 | Braun et al. |
| 2012/0313962 A1 | 12/2012 | Hsu et al. |
| 2012/0317123 A1 | 12/2012 | Green et al. |
| 2013/0044123 A1 | 2/2013 | Shah et al. |
| 2013/0057566 A1 | 3/2013 | Kriese et al. |
| 2013/0066819 A1* | 3/2013 | Nice et al. ...................... 706/14 |
| 2014/0025619 A1 | 1/2014 | Michelstein et al. |
| 2014/0075314 A1 | 3/2014 | Bachman et al. |
| 2014/0075324 A1 | 3/2014 | Howard et al. |
| 2014/0208250 A1 | 7/2014 | Ording et al. |
| 2014/0223357 A1 | 8/2014 | Ording et al. |

FOREIGN PATENT DOCUMENTS

| | | |
|---|---|---|
| FR | 2693810 | 6/1991 |
| TW | 201135578 A | 10/2011 |
| WO | WO 89/11694 | 11/1989 |
| WO | WO2007119927 A1 | 10/2007 |
| WO | WO2011109181 A1 | 9/2011 |

OTHER PUBLICATIONS

Chavanu, "Use iTunes Genius Mixes As Your Personal Music DJ", Aug 18, 2010, <URL: http://www.makeuseof.com/tag/itunesgeniusmixespersonalmusicdj>, p. 1-6.*

Apple Computer, "Inside Macintosh," Apple Technical Library, Chapter 6, Dec. 1992, 26 pages.

U.S. Appl. No. 14/096,717, filed Dec. 4, 2013, 54 pages.

Cowart, "Mastering Windows 3.1," Sybex Inc., 1992, 46 pages.

Duntemann, "Complete Turbo Pascal," Scott, Foresman and Company, Third Edition, Nov. 8, 1994, 33 pages.

IBM Corp., "Automatic Window Management Mode," IBM Technical Disclosure Bulletin, vol. 35, No. 4B, Sep. 1992, 1 page.

IBM Corp., "Developer's Desktop," IBM Technical Disclosure Bulletin, vol. 33, No. 6B, Nov. 1990, 4 pages.

IBM Corp. "Notebook Tabs as Target Location for Drag/Drop Operations," IBM Technical Disclosure Bulletin, vol. 35, No. 7, Dec. 1992, 1 page.

INPI, "Preliminary Research Report," No. 9206603000, INPI, Feb. 2, 1996, 3 pages.

Johnson, et al., "The Xerox Star: A Retrospective ", Scott, Foresman and Company, Sep. 21, 1989, 18 pages.

Johnston, "Window Shade Version 1.1 Program," Interactive Technologies, Inc., Stuart Florida, Oct. 28, 1989, 2 pages.

Lam et al., "The NewWave Office," Hewlett-Packard Journal, Aug. 30, 1990, vol. 40, No. 4, 10 pages.

Mander et al., "A Pile Metaphor for Supporting Casual Organization of Information," ACM Conference on Human Factors in Computing Systems (CHI '92 Conference Proceedings): Striking a Balance (May 3, 1992, 9 pages.

(56) References Cited

OTHER PUBLICATIONS

Microsoft Corporation, "Microsoft Windows™ User Guide," Microsoft Corporation, 1985-1990, Verson 3.0, 3 pages.
Microsoft Corporation, "Microsoft Windows™ Program Manager," Screen Dumps from Microsoft Windows™ V. 3.1, Microsoft Corporation, 1985-1992, 14 pages.
Myers, "Window Interfaces, A Taxonomy of Window Manager User Interfaces.," IEEE Computer Graphics and Applications, Sep. 1, 1988, 20 pages.
Pogue, et al., MacOSX: The Missing Manual, Panther Edition, 2003, 232 pages.
Shebanek, "The Complete Guide to the NextStep User Environment," Sep. 23, 1993, 114 pages.
The NeXt™, "User's Reference Manual", c1989, by NeXt™, Inc., 10 pages.
Tyne, "Thinking Person's Guide to OS.2.2.1," John Wiley & Sons Inc., Oct. 29, 1993, 8 pages.
"Using Desktop and Drawers to Predefine Path," Research Disclosure, No. 312, Apr. 1990, 1 page.
"Virtual Office Desktop Drawers," Research Disclosure No. 305, Sep. 1989, 1 page.
Viticci, "Web-based, Social iTunes Store Launching Next Week?", MacStories, http://www.macstories.net/news/web-based-social-itunes-store-launching-next-week/>, Aug. 26, 2010, 4 pages.
Wikipedia.org., "Macintosh Finder Software," retrieved from the Internet, Jul. 2009, 8 pages.
Williams, et al. "The Robin Williams MAC OS X book, Jaguar Edition", Dec. 26, 2002, 173 pages.
WWW.Cocoatech.com et al., "Path Finder in a Flash", http://web.archive.org/web/20040505134139;/cocoatech.com/manual/html/flash.html, May 5, 2004, 33 pages.
Office Action, dated Jun. 27, 2007, received in U.S. Appl. No. 10/873,661, 18 pages.
Office Action, dated Dec. 31, 2007, received in U.S. Appl. No. 10/873,661, 17 pages.
Final Office Action, dated Jul. 10, 2008, received in U.S. Appl. No. 10/873,661, 22 pages.
Office Action, dated Feb. 17, 2009, received in U.S. Appl. No. 10/873,661, 23 pages.
Office Action, dated Aug. 3, 2009, received in U.S. Appl. No. 10/873,661, 23 pages.
Final Office Action, dated Mar. 8, 2010, received in U.S. Appl. No. 10/873,661, 29 pages.
Office Action, dated Jun. 7, 2013, received in U.S. Appl. No. 10/873,661, 10 pages.
Office Action, dated Apr. 23, 2015, received in U.S. Appl. No. 14/096,717, 7 pages.
Office Action, dated Jul. 8, 2014, received in U.S. Appl. No. 14/204,977, 26 pages.
Final Office Action, dated Feb. 2, 2015, received in U.S. Appl. No. 14/204,977, 22 pages.
Ray et al., "Mac OS X: Unleashed," USA, Nov. 2001, 182 pages.
Final Office Action, dated Feb. 1, 2016, received in U.S. Appl. No. 14/096,717, 15 pages.
Cohen, et al., "Color Harmonization," Tel Aviv University, Jan. 1, 2006, 7 pages.
Conner, "Using iTunes 10," Feb. 2011, Que Publishing, 19 pages.
Dong, "Chameleon: Color Transformation on OLED Displays," Department of Electrical & Computer Engineering, Rice University, Houston TX, May 2012, 1 page.
Meier, "ACE: A Color Expert System for User Interface Design," Department of Comuper Science, Brown University, Jan. 3, 1988, 12 pages.
Tanner, "iTunes Guide, A beginners guide to the iTunes," the Maccast Lemon Productions, Dec. 14, 2006, 14 pages.
Office Action, dated Jun. 18, 2015, received in U.S. Appl. No. 13/893,031, 13 pages.
Office Action, dated May 25, 2015, received in Taiwanese Patent Application No. 102131693, which corresponds with U.S. Appl. No. 13/893,031, 8 pages.
Office Action, dated Apr. 9, 2015, received in U.S. Appl. No. 13/893,072, 31 pages.
International Search Report and Written Opinion, dated Jan. 2, 2014, received in International Patent Application No. PCT/US2013/054364, which corresponds with U.S. Appl. No. 13/893,031, 12 pages.
International Preliminary Report on Patentability, dated Mar. 17, 2015, received in International Patent Application No. PCT/US2013/054364, which corresponds with U.S. Appl. No. 13/893,031, 9 pages.
Notice of Allowance, dated Aug. 21, 2015, received in U.S. Appl. No. 13/893,072, 7 pages.
Office Action, dated Apr. 11, 2016, received in U.S. Appl. No. 14/204,977, 17 pages.
Notice of Allowance, dated Aug. 30, 2016, received in U.S. Appl. No. 14/204,977, 10 pages.

* cited by examiner

FIG. 6B

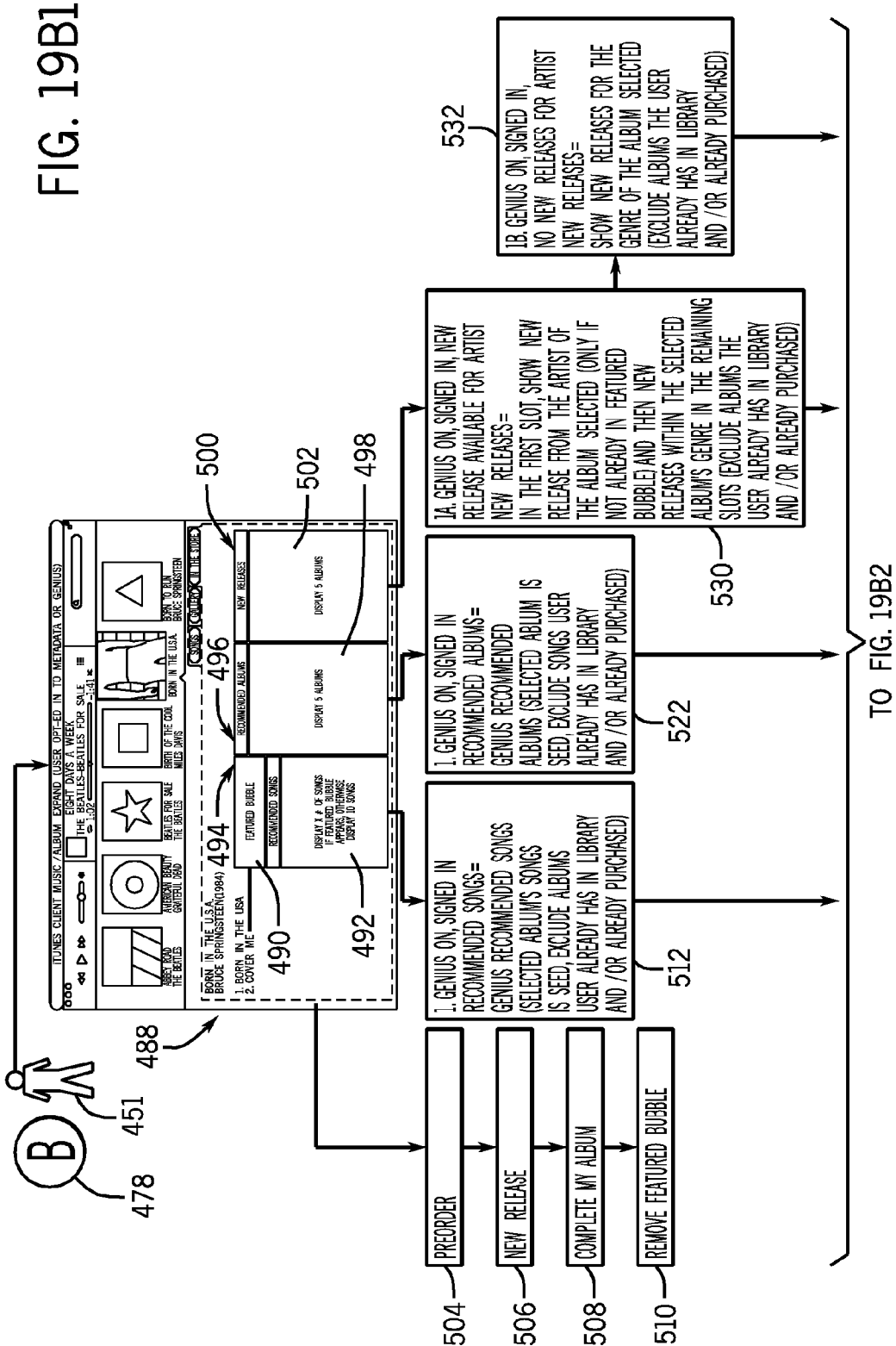
FIG. 19B1

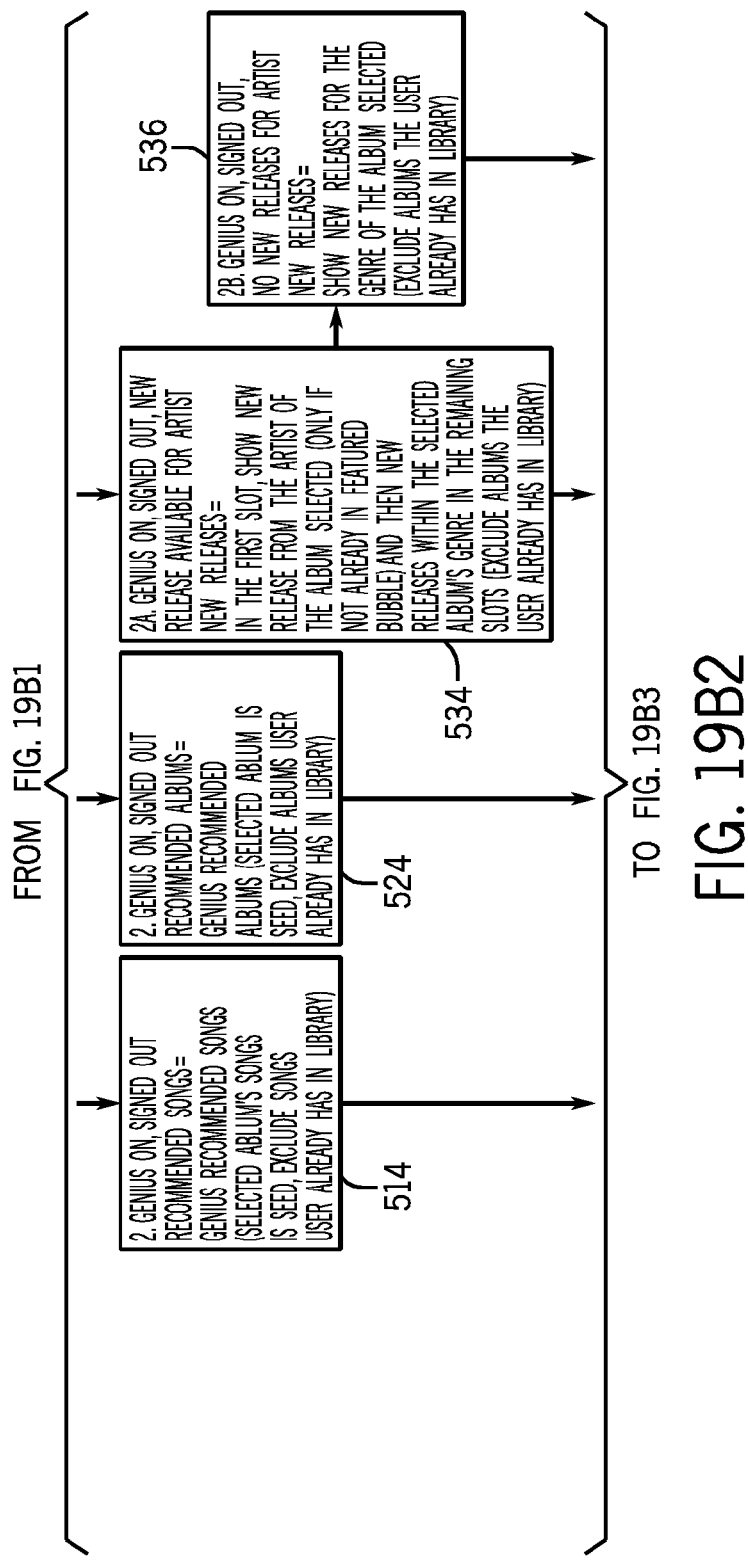
FIG. 19B2

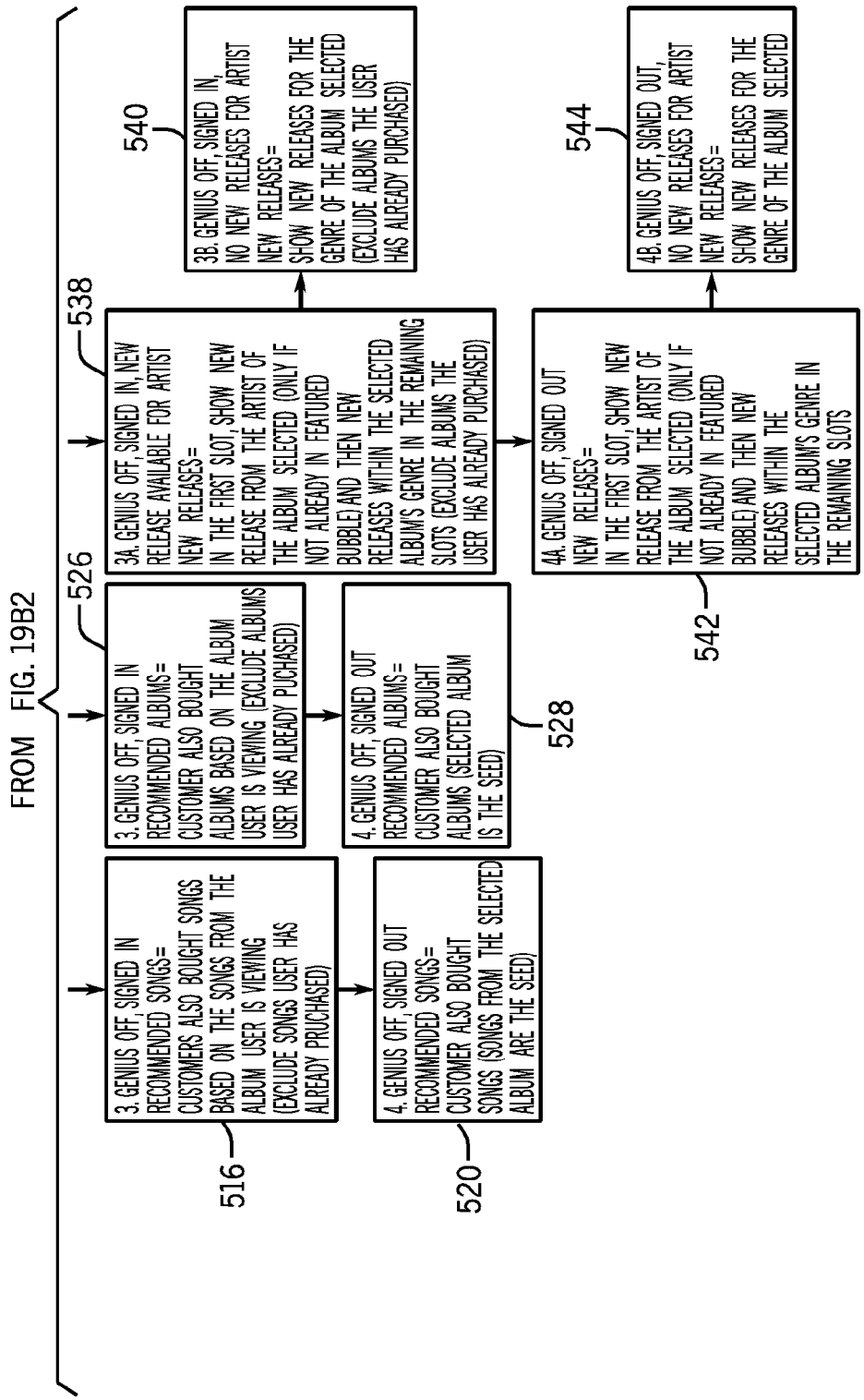
FIG. 19B3

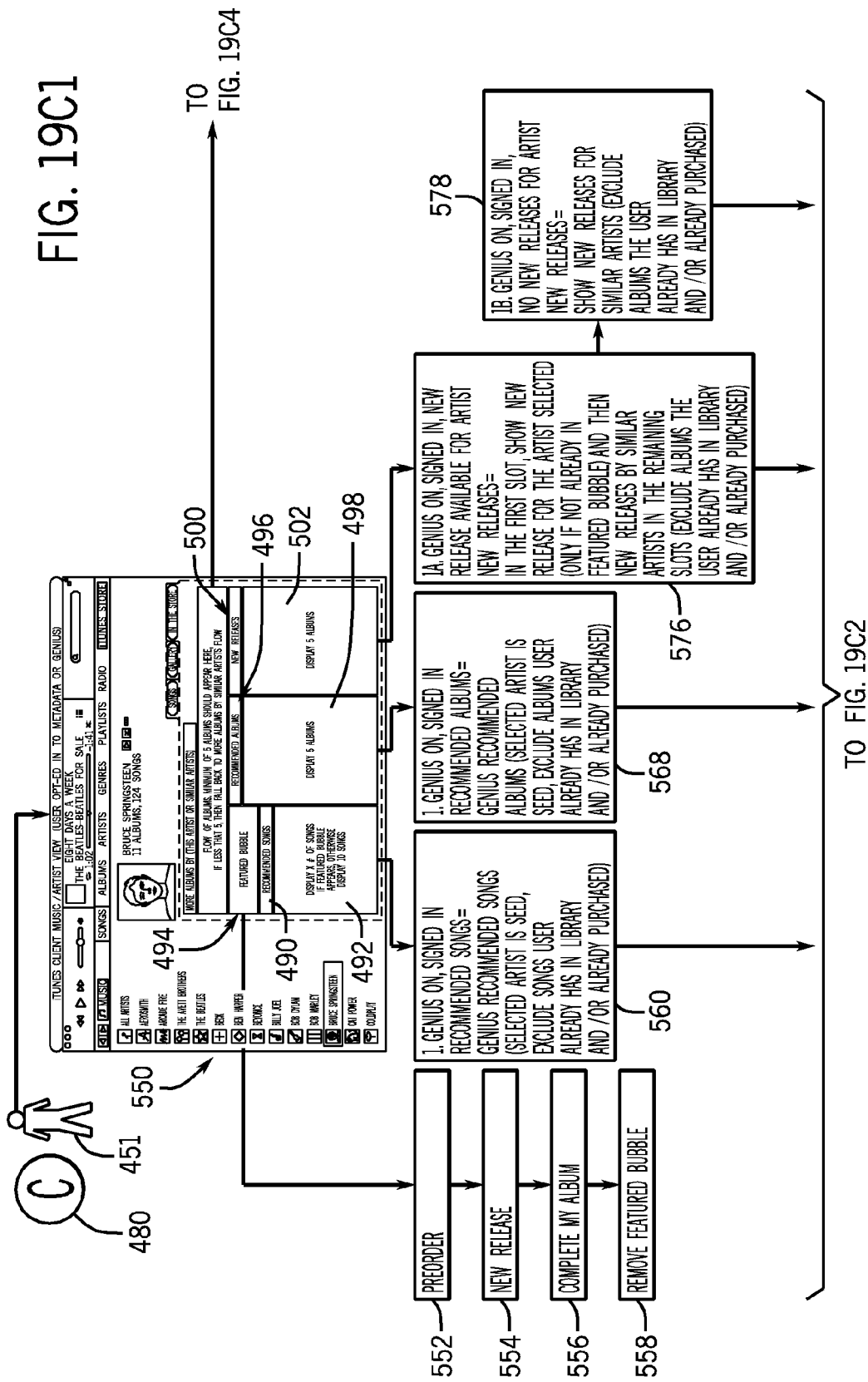

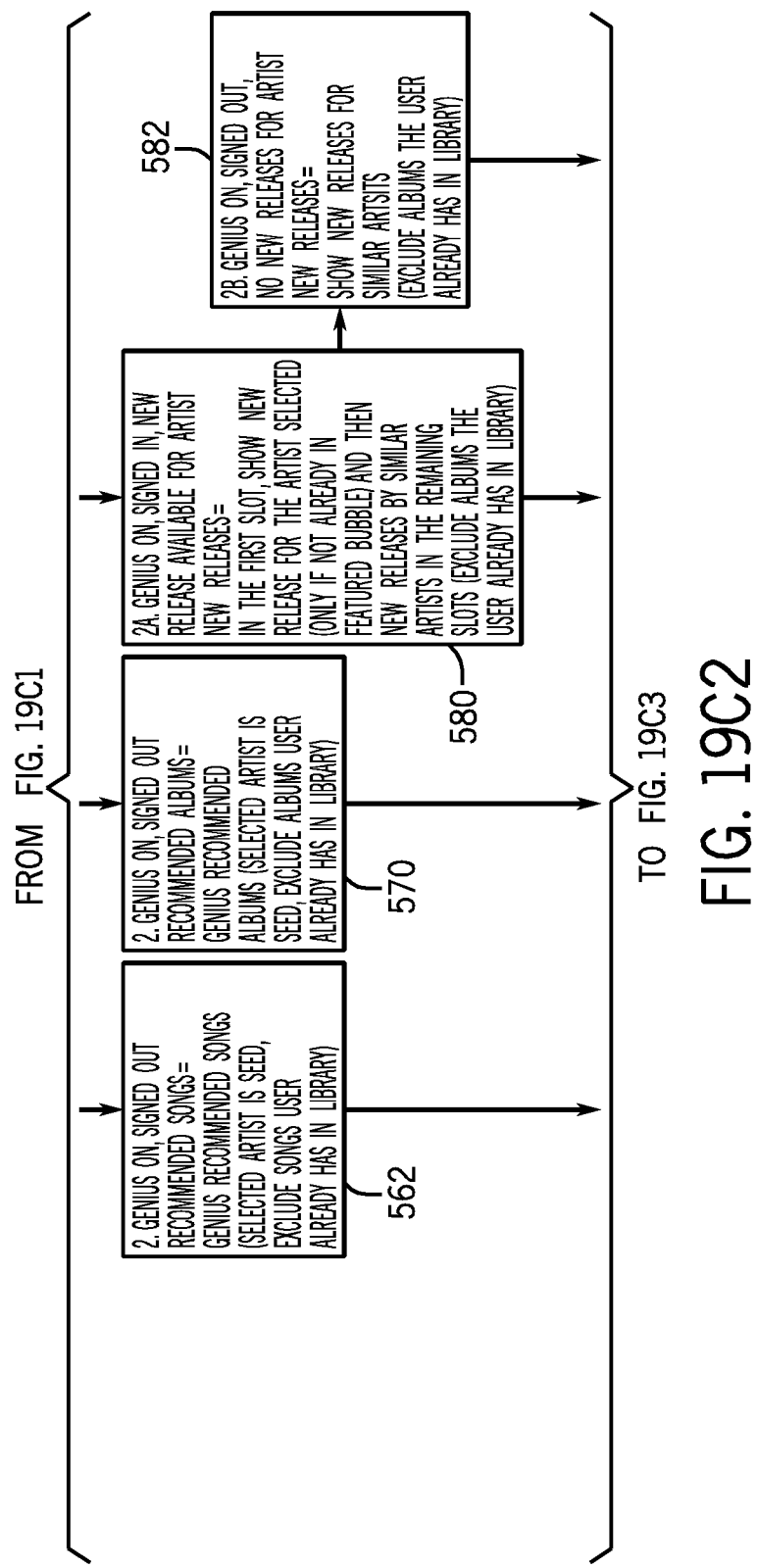
FIG. 19C2

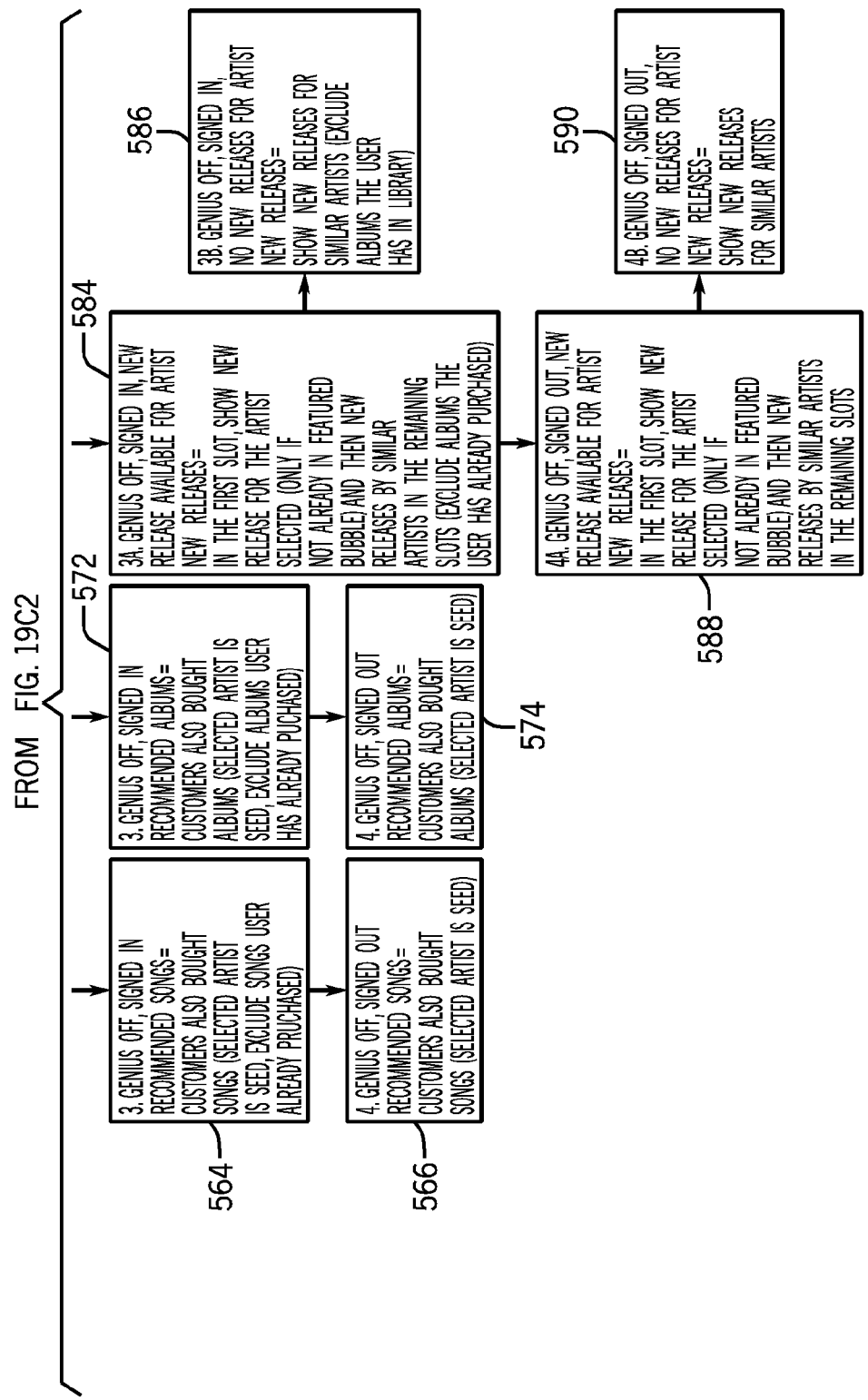
FIG. 19C3

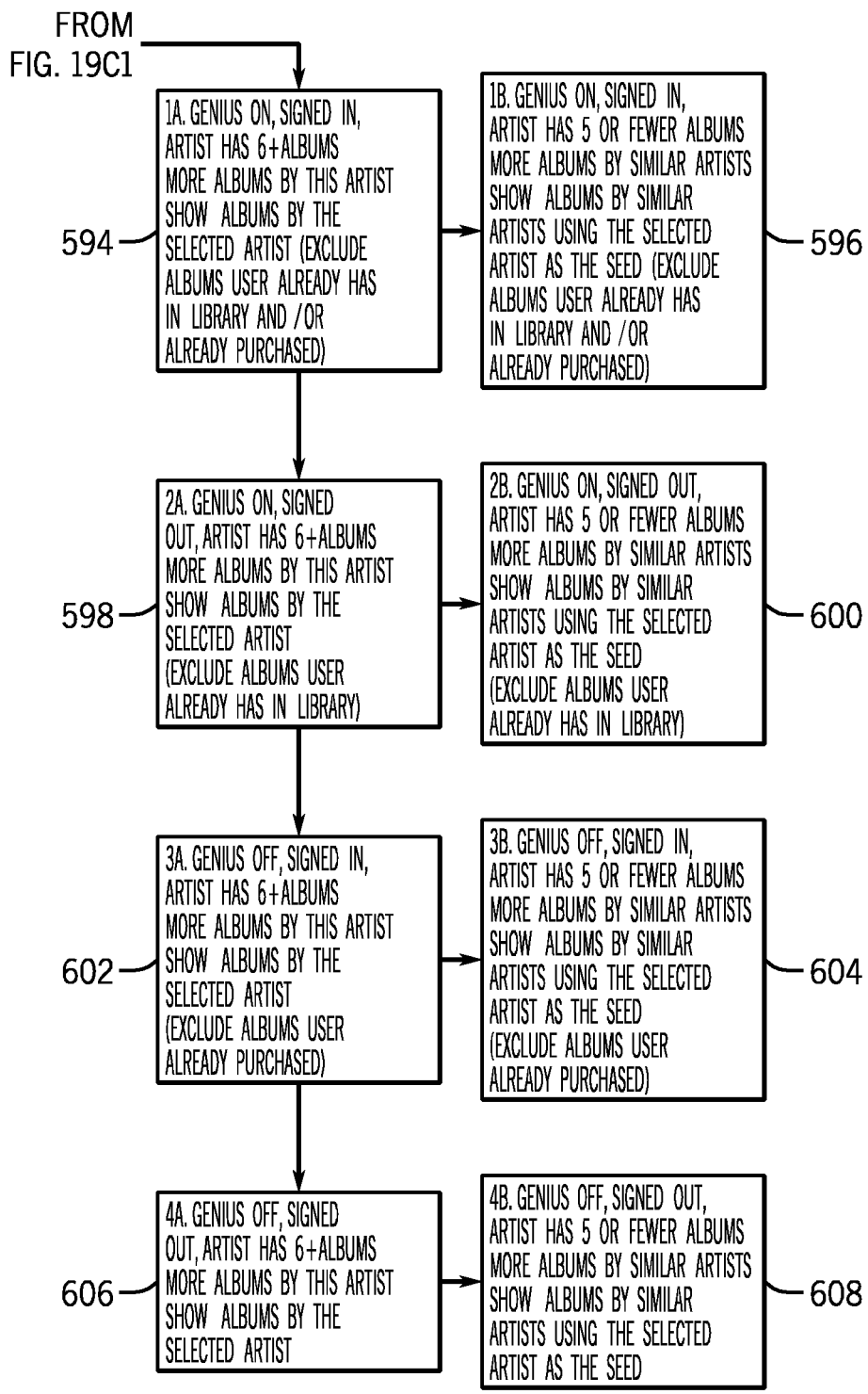
FIG. 19C4

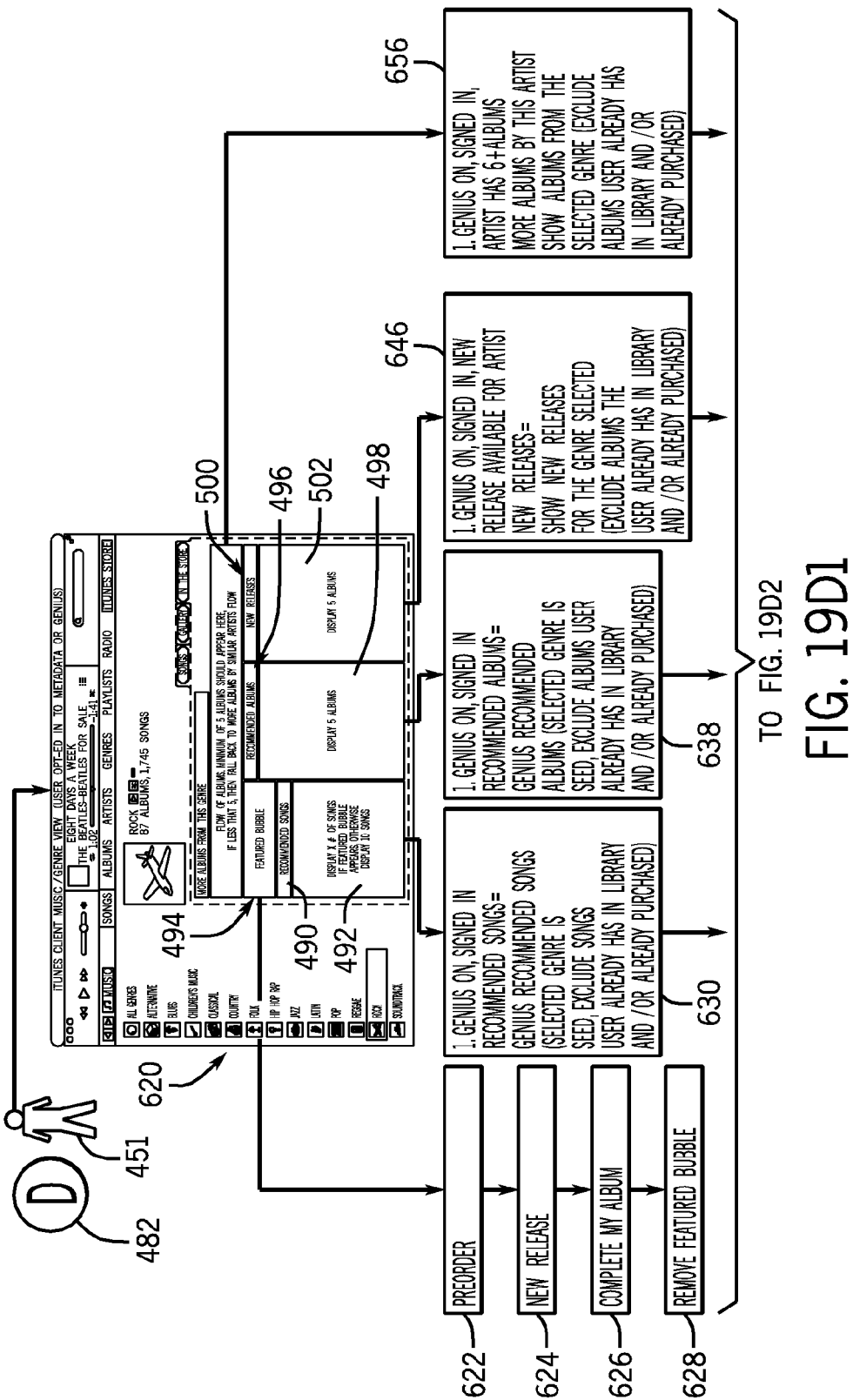
FIG. 19D1

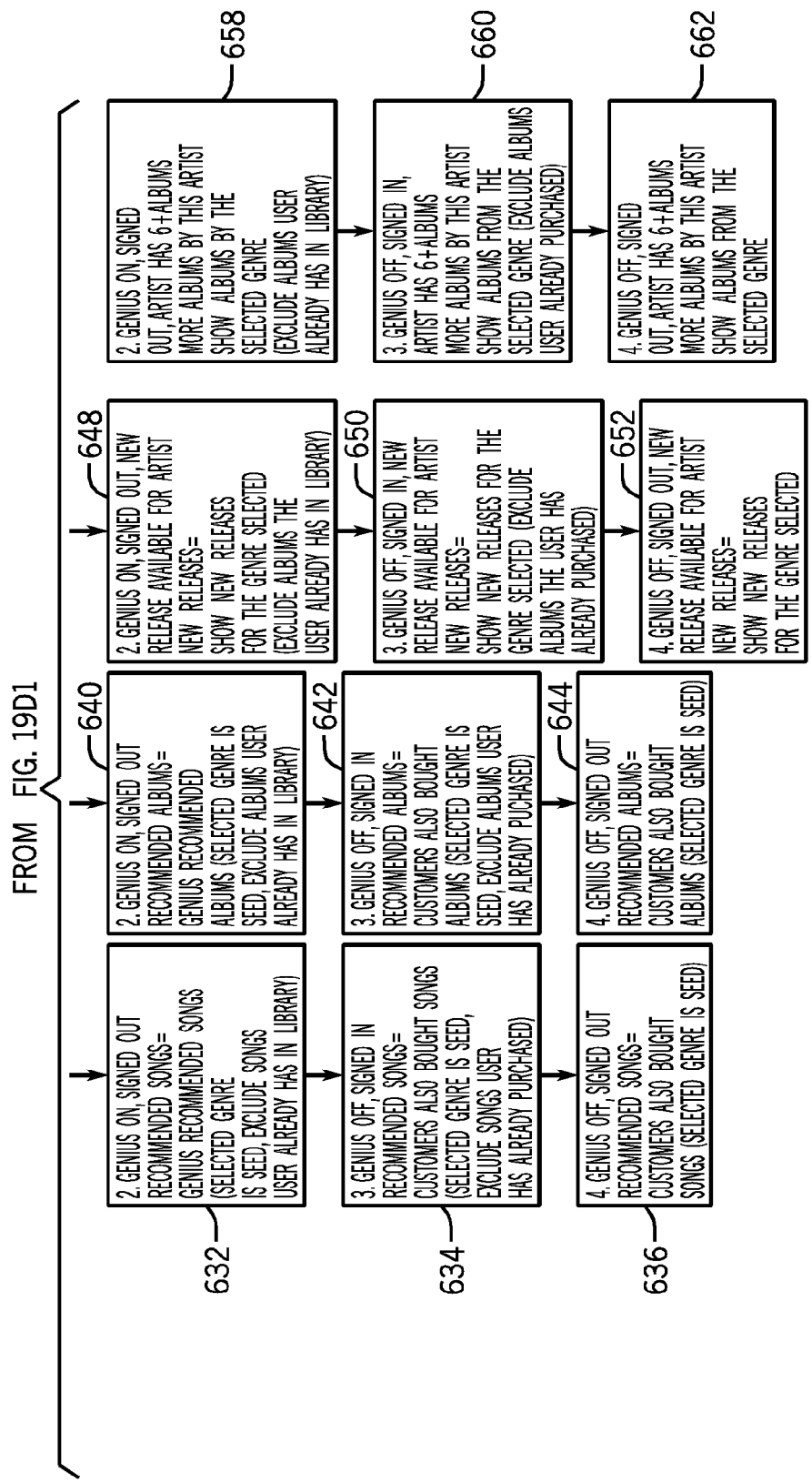
FIG. 19D2

INTEGRATED CONTENT RECOMMENDATION

BACKGROUND

This application is a Non-Provisional of U.S. Provisional Patent Application No. 61/699,788, entitled "Integrated Content Recommendation", filed Sep. 11, 2012, which is herein incorporated by reference.

The present disclosure relates generally to a graphical user-interface, and, more particularly, to integrating content recommendations into the graphical user-interface.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As the prevalence of electronic devices has increased, content, such as movies, music, images, etc., has largely become available in a digital format, displayable by these electronic devices. Accordingly, digital content players for electronic devices have become very prevalent. Manufacturers of these content players have integrated electronic storefronts into these content players to entice users to purchase additional content from the manufacturer.

One way that users have been enticed to purchase additional content, is through providing recommendations regarding content the user may be interested in, based upon certain features known about the user's tastes. Unfortunately, these recommendations are typically displayed in a static layout (e.g., static color-scheme, background images, etc.) that appears segmented from the rest of the content player, thus creating a segmented user experience.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for dynamically altering a graphical user-interface layout to include integrated recommendations of content based upon a current selection and/or content that is currently playing in a content player application. In some embodiments, a digital content player may be enabled to display dynamically changing layout parameters (e.g., background colors, background images, text colors, etc.). The recommendations may match these layout parameters, such that the recommendations appear seamless, even when the recommendations are provided by an external computer. Accordingly, the layout of content player may be enhanced by providing a cohesive recommendation list of digital content. In some embodiments, the recommendations may relate to items in an electronic storefront that have not been acquired by a user of the content player.

BRIEF DESCRIPTION OF THE DRAWINGS

Various aspects of this disclosure may be better understood upon reading the following detailed description and upon reference to the drawings in which:

FIG. 6B illustrates an alternative exemplary content player graphical user-interface with seamless user recommendations provided in three-column format, in accordance with an embodiment;

FIGS. 19A-G is an example of a flow for an in the store recommendation system, in accordance with an embodiment.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present process enables recommendations of digital content to be provided from a computer external to the computer displaying the recommendations, while maintaining the layout of the computer displaying the recommendations. For example, a content player, such as the iTunes® application, available from Apple Inc. of Cupertino, California, may be enabled to receive and present a set of recommendations that have been formatted by an external computer to match formatting of the content player. Formatting of the recommendations may include changes to the background image and/or color as well as text color of a page listing the recommendations.

Figure 1:
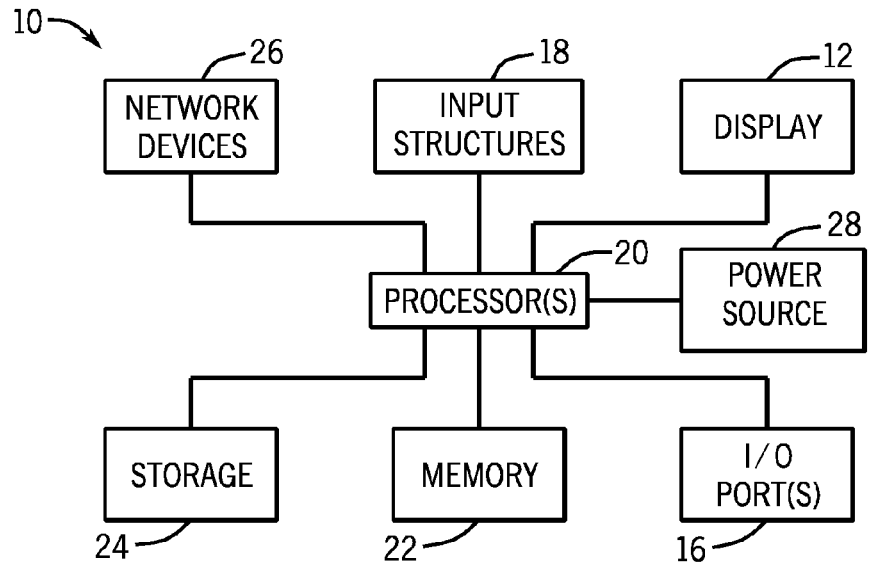
FIG. 1 is a block diagram of an example of components of an electronic device, in accordance with an embodiment.
Figure 2:
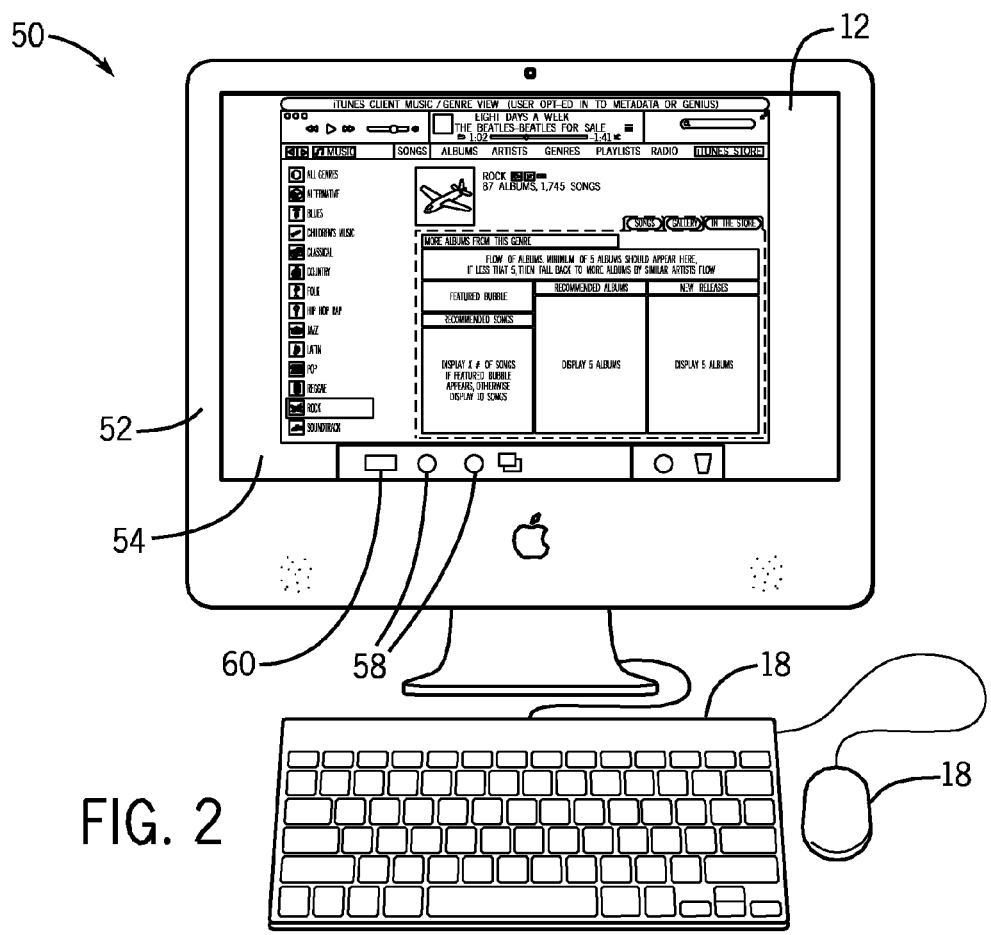
FIG. 2 is a schematic diagram of an electronic device, in accordance with an embodiment.

With these foregoing features in mind, a general description of suitable electronic devices for implementing aspects of the present techniques are described below. In FIG. 1, a block diagram depicting various components that may be present in electronic devices suitable for use with the present techniques is provided. In FIG. 2, one example of a suitable electronic device, here provided as a desktop computer, is depicted. This type of electronic device, and other electronic devices providing comparable storage and/or processing capabilities, may be used in conjunction with the present techniques. For example, these and similar types of electronic devices may be used to display a dynamic layout graphical user-interface, in accordance with the teachings of the present disclosure.

An example of a suitable electronic device may include various internal and/or external components which contribute to the function of the device. FIG. 1 is a block diagram illustrating the components that may be present in such an electronic device 10 and which may allow the device 10 to function in accordance with the techniques discussed herein. Those of ordinary skill in the art will appreciate that the various functional blocks shown in FIG. 1 may comprise hardware elements (including circuitry), software elements (including computer code stored on a machine-readable medium) or a combination of both hardware and software elements. It should further be noted that FIG. 1 is merely one example of a particular implementation and is merely intended to illustrate the types of components that may be present in a device 10. For example, in the presently illustrated embodiment, these components may include a display 12, I/O ports 16, input structures 18, one or more processors 20, a memory device 22, a non-volatile storage 24, a networking device 26, and a power source 28.

With regard to each of these components, the display 12 may be used to display various images generated by the device 10. The display 12 may be any type of display such as a cathode ray tube (CRT), a liquid crystal display (LCD), a light emitting diode (LED) display, an organic light emitting diode (OLED) display, or other suitable display. Additionally, in certain embodiments of the electronic device 10, the display 12 may include a touch-sensitive element, such as a touch screen.

The I/O ports 16 may include ports configured to connect to a variety of external devices, such as a power source or other electronic devices (such as handheld devices and/or computers, printers, projectors, external displays, modems, docking stations, and so forth). The I/O ports 16 may support any interface type, such as a universal serial bus (USB) port, a video port, a serial connection port, a IEEE-1394 port, an Ethernet or modem port, and/or an AC/DC power connection port.

The input structures 18 may include the various devices, circuitry, and pathways by which user input or feedback is provided to the processor 20. Such input structures 18 may be configured to control a function of the device 10 when actuated. For example, the input structures 18 may include buttons, sliders, switches, control pads, keys, knobs, scroll wheels, keyboards, mice, touchpads, and so forth.

In certain embodiments, an input structure 18 and display 12 may be provided together, such as in the case of a touchscreen where a touch sensitive mechanism is provided in conjunction with the display 12. In such embodiments, the user may select or interact with displayed interface elements via the touch sensitive mechanism. In this way, the displayed user interface may provide interactive functionality, allowing a user to select, by touch screen or other input structure, from among options displayed on the display 12.

User interaction with the input structures 18, such as to interact with a user or application interface displayed on the display 12, may generate electrical signals indicative of the user input. These input signals may be routed via suitable pathways, such as an input hub or bus, to the processor(s) 20 for further processing.

The processor(s) 20 may provide the processing capability to execute the operating system, programs, user and application interfaces, and any other functions of the electronic device 10. The processor(s) 20 may include one or more microprocessors, such as one or more "general-purpose" microprocessors, one or more special-purpose microprocessors and/or ASICS, or some combination of such processing components. For example, the processor 20 may include one or more reduced instruction set (RISC) processors, as well as graphics processors, video processors, audio processors and/or related chip sets.

The instructions or data to be processed by the processor(s) 20 may be stored in a memory 22. The memory 22 may be provided as a volatile memory, such as random access memory (RAM), and/or as a non-volatile memory, such as read-only memory (ROM). The memory 22 may store a variety of information and may be used for various purposes. For example, the memory 22 may store firmware for the electronic device 10 (such as a basic input/output instruction or operating system instructions), other programs that enable various functions of the electronic device 10, user interface functions, processor functions, and may be used for buffering or caching during operation of the electronic device 10.

The components may further include a non-volatile storage 24 for persistent storage of data and/or instructions. The non-volatile storage 24 may include flash memory, a hard drive, or any other optical, magnetic, and/or solid-state storage media. The non-volatile storage 24 may be used to store data files such as personal information (e.g., financial and other account information), software (e.g., an application used to store, synchronize, and/or manage financial and other account information on the electronic device 10 or on another electronic device), wireless connection information (e.g., information that may enable the electronic device 10 to establish a wireless connection, such as a telephone or wireless network connection), and any other suitable data.

The components depicted in FIG. 1 also include a network device 26, such as a network controller or a network interface card (NIC). In one embodiment, the network device 26 may be a wireless NIC providing wireless connectivity over any 802.11 standard or any other suitable wireless networking standard. The network device 26 may allow the electronic device 10 to communicate over a network, such as a Local Area Network (LAN), Wide Area Network (WAN), or the Internet. Further, the electronic device 10 may connect to and send or receive data with any device on the network, such as portable electronic devices, personal computers, printers, and so forth. Alternatively, in some embodiments, the electronic device 10 may not include a network device 26. In such an embodiment, a NIC may be added as an expansion card to provide similar networking capability as described above.

Further, the components may also include a power source 28. In one embodiment, the power source 28 may be one or more batteries, such as a lithium-ion polymer battery. The battery may be user-removable or may be secured within the housing of the electronic device 10, and may be rechargeable. Additionally, the power source 28 may include AC power, such as provided by an electrical outlet, and the electronic device 10 may be connected to the power source 28 via a power adapter. This power adapter may also be used to recharge one or more batteries if present.

FIG. 2 illustrates an electronic device 10 in the form of a desktop computer 50, such as an iMac® by Apple Inc., that may be used to generate and/or present a dynamic layout graphical user-interface. It should be noted that while the techniques will be described below in reference to illustrated electronic device 50 (which may be a desktop computer), the techniques described herein are usable with any electronic device employing a display. For example, other electronic devices may include a laptop computer, a tablet computer, a viewable content player, a mobile phone, a personal data organizer, a workstation, a standalone display, or the like. In certain embodiments, the electronic device may include a model of an iMac®, Mac® mini, Mac Pro®, MacBook®, a MacBook® Pro, MacBook Air®, Apple Cinema Display®, Apple Thunderbolt Display®, iPad®, iPod® or iPhone® available from available from Apple Inc. of Cupertino, Calif. In other embodiments, the electronic device may include other models and/or types of electronic devices, available from any manufacturer.

As illustrated in FIG. 2, the desktop computer 50 includes a housing 52 that supports and protects interior components, such as processors, circuitry, and controllers, among others, that may be used to generate images to display on display 12. Desktop computer 50 also includes user input structures 18, shown here as a keyboard and a mouse, that may be manipulated by a user to interact with desktop computer 50. For example, user input structures 18 may be employed to operate a graphical user interface (GUI) 54 of an operating system running on the desktop computer 50 as well as a GUI 56 of applications running on desktop computer 50. Input structures 18 may be connected to the electronic device 10 through a wired or wireless configuration. Further, in certain embodiments, electronic device 10 may include other types of user input structures, such as a touchscreen or trackpad, among others.

The GUI 54 may include various layers, windows, screens, templates, or other graphical elements that may be displayed in all, or a portion, of the display 12. Generally, the GUI 54 may include graphical elements 58 that represent applications and functions of the electronic device. The graphical elements 58 may include icons and other images representing buttons, sliders, menu bars, and the like. The icons may correspond to various applications of the electronic device that may open upon selection of a respective icon. Furthermore, selection of an icon may lead to a hierarchical navigation process, such that selection of an icon leads to a screen that includes one or more additional icons or other GUI elements 58. The icons may be selected via a touch screen included in the display 12, or may be selected by a user input structure 18, such as a wheel or button.

When an icon is selected, the desktop computer 50 may be configured to open an application associated with that icon and display a corresponding screen. For example, when the "iTunes" icon 60 is selected, the desktop computer 50 may be configured to open an application GUI 56 for the iTunes® application.

As discussed above the content player (e.g., the iTunes® application) may include functionality to: request recommendations based upon data obtained from the content player, receive the recommendations in a format that matches the GUI 56 of the iTunes® environment, and display the formatted recommendations in the content player.

Figure 3:
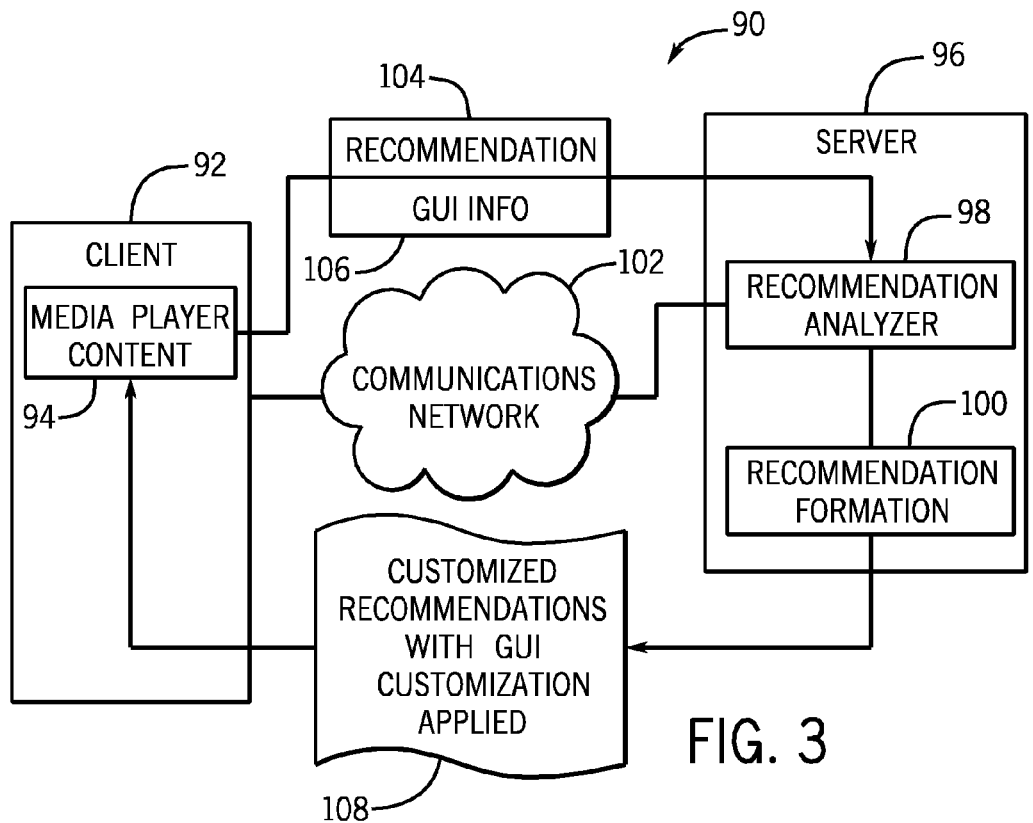
FIG. 3 illustrates a system where a server, external to the content player, generates a formatted list of recommendations to be displayed by the content player, in accordance with an embodiment.

FIG. 3 is a schematic view of an integrated content recommendation system 90, in accordance with an embodiment. The system 90 may include a client 92 hosting a content player 94, such as a version of the iTunes® application, by Apple Inc. The client 92 may be connected to a server 96 that may host one or more services (e.g., recommendation analyzer 98 and/or recommendation formatter 100) to provide recommendations for content to the client 92, and ultimately, the content player 94. The client 92 and server 96 may be connected via a communications network 102, such as the Internet.

As illustrated, information 104 useful to make accurate recommendations and GUI information 106 may be sent from the content player 94 of the client 92 to the server 96 via the communications network 102. The information 104 may include a variety of attributes pertaining to content played and/or accessed by the content player 94. For example, frequently accessed genres, artists, albums, songs, movies, television episodes, etc. may be included in the information 104. In some embodiments, the information 104 may include playlists or other lists that describe a relationship between multiple pieces of content. The information 104 may include a list of content stored and/or owned by a user of the content player 94. Further, the information 104 may include user attribute information, such as the user's location, age, sex, etc. The information 104 may include an indication of content or content attributes that are currently being played in the content player 94. For example, the information 104 may include an indication that a particular song, album, artist, and/or genre is currently playing. In some embodiments, metadata relating to content may be included in the information 104. For example, metadata for content in a media library may be accumulated from the client 92 and/or may be determined from a metadata database, such as Gracenote®.

Based upon this information 104, the recommendation analyzer 98 may provide content recommendations. For example, the recommendation analyzer 98 may make playlist recommendations, such as through a Genius® feature in iTunes®. Further, recommendations of particular items, such as songs, albums, TV episodes, movies, podcasts, etc. that the user of the content player 94 may wish to acquire based upon the information 104 may be provided. For example, the recommendation analyzer 98 may determine that a user has five songs found on a particular album and that other user's have typically acquired the whole album.

Accordingly, the recommendation analyzer 98 may recommend the remaining un-acquired songs from the album.

While the recommendation analyzer 98 and the recommendation formatter 100 are illustrated as two separate services, such illustration is not intended to limit the scope of this disclosure. For example, the recommendation analyzer 98 and the recommendation formatter 100 may be combined into a single service or may be further broken down into more than two services.

As discussed above, the information 104 may indicate a particular song, album, artist, and/or genre that is currently paying in the content player 94. Accordingly, a view may be integrated into the content player 94 that provides recommendations based upon the content that is currently playing. As may be appreciated, there may be different levels of granularity associated with particular selections within the content player 94. For example, as discussed above, in a music context, a user may select a particular genre, artist, album, and/or song. As the granularity of the information 104 is increased, the recommendation accuracy may also increase. When there are less granular offerings, the recommendation accuracy may be decreased.

Information 106 may include a page size that may be accepted by the content player 94. For example, the content player may have a 300 pixel width x 300 pixel height placeholder to provide content recommendations provided by the server 96. Such information may be provided in the information 106. Further, information 104 may include information about a color scheme and/or other look and feel elements that should be considered when generating the recommendations. For example, the information 106 may include may include a color scheme including particular colors to use for primary text, secondary text, and/or tertiary text. Further, the information 106 may specify a particular background color and/or background image to be displayed.

Based upon the recommendations determined by the recommendation analyzer 98 and based upon the GUI information 106, the recommendation formatter 100 may generate a page 108 containing the recommendations and that is customized for the GUI of the content player 94. Accordingly, the content player 94 may reference the page 108 (e.g., by in taking and displaying the page 108 or presenting an externally served page 108, such as a webpage served from server 96).

Figure 4:
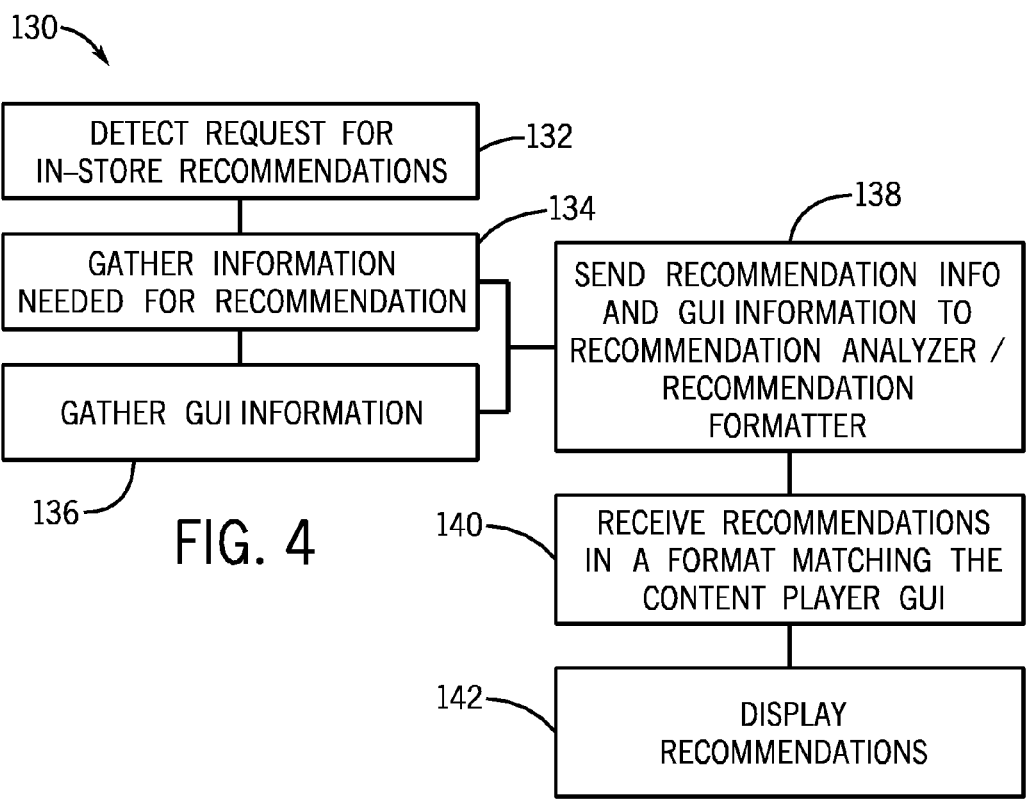
FIG. 4 is a flowchart illustrating a process for displaying a seamless set of user recommendations in a content player, in accordance with an embodiment.

FIG. 4 illustrates a process 130 for presenting integrated content recommendations in a content player, such as content player 94 of FIG. 3. The process 130 begins by detecting a request for content recommendations, such as content recommendations from a particular electronic storefront (e.g., an iTunes® storefront provided by Apple Inc.) (block 132). The content player may detect a request for recommendations based upon a user providing input via an input structure. For example, as will be discussed in more detail regarding FIGS. 6A and 6B, the user may select an "In the store" button or tab on the content player that indicates a desire to receive content recommendations from the storefront. Information useful for making the recommendation, such as information 104 of FIG. 3, is gathered (block 134). Additionally, the GUI information, such as information 106 of FIG. 3, is gathered (block 136). The information gathered from blocks 134 and 136 are provided to a computer serving a content recommendation analyzer 98 and/or recommendation formatter 100, such as server 96 of FIG. 3 (block 138). The information may be sent as a single set of data or may be sent in multiple sets of data. For example, the information obtained in block 134 may be provided to the recommendation analyzer 98 and the information obtained in block 136 may be separately provided to the recommendation formatter 100. Alternatively, both the data obtained in block 134 and the data obtained in block 136 may be sent, in a combined data set, to the recommendation analyzer 98 and/or the recommendation formatter 100. Once recommendations have been prepared by the recommendation analyzer 98 and/or the recommendation formatter 100, the formatted recommendations are received by the content player (block 140) where they are displayed by the content player (block 142). As discussed above, recommendation data may be provided directly to the content player or the content player may access a web page or other form of formatted recommendation list hosted by a server.

Figure 5:
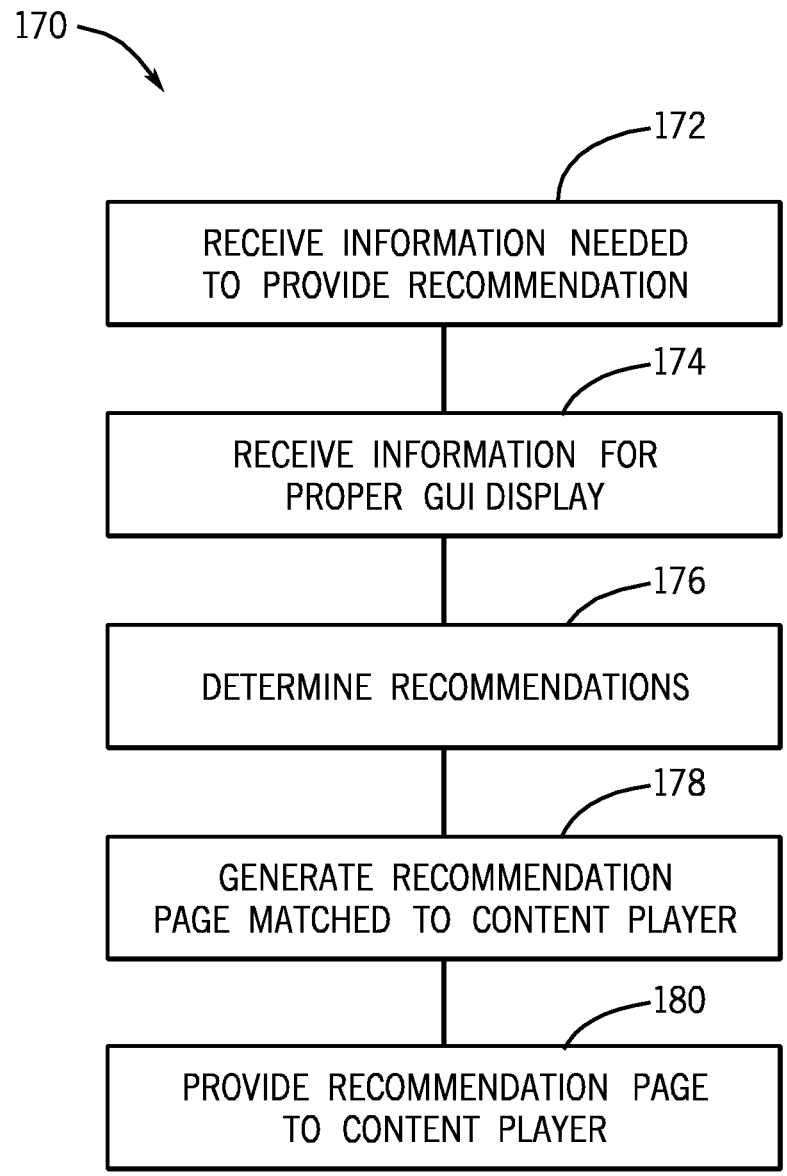
FIG. 5 is a flowchart illustrating a process for providing a seamless view of recommendations from a server to the content player, in accordance with an embodiment.

FIG. 5 illustrates a process 170 for providing an integrated list of recommendations to the content player, such as the content player 94 of FIG. 3. The process begins by receiving information useful for making recommendations and information useful for formatting recommendation results in a manner that the results may appear integrated into the GUI of the content player (blocks 172 and 174, respectively). The recommendations are determined based at least in part upon the information received in block 172 (block 176). For example, the currently selected content may be provided in the information and may be a basis for recommendations determined in block 176. Next, a recommendation page (e.g., page 108 of FIG. 3) is generated (block 178). The recommendation page (e.g., page 108 of FIG. 3) may include a layout/look and feel that matches the GUI of the content player by applying GUI information received from block 174 to the layout/look and feel of the recommendation page (e.g., page 108 of FIG. 3). Last, the formatted recommendation page (e.g., page 108 of FIG. 3) is provided to the content player (block 180). For example, the page (e.g., page 108 of FIG. 3) may be served by the server as a web page or the page may be transmitted to the content player in the form of a web page or XML page or other page that may be transformed into a webpage at the content player.

Figure 6A:
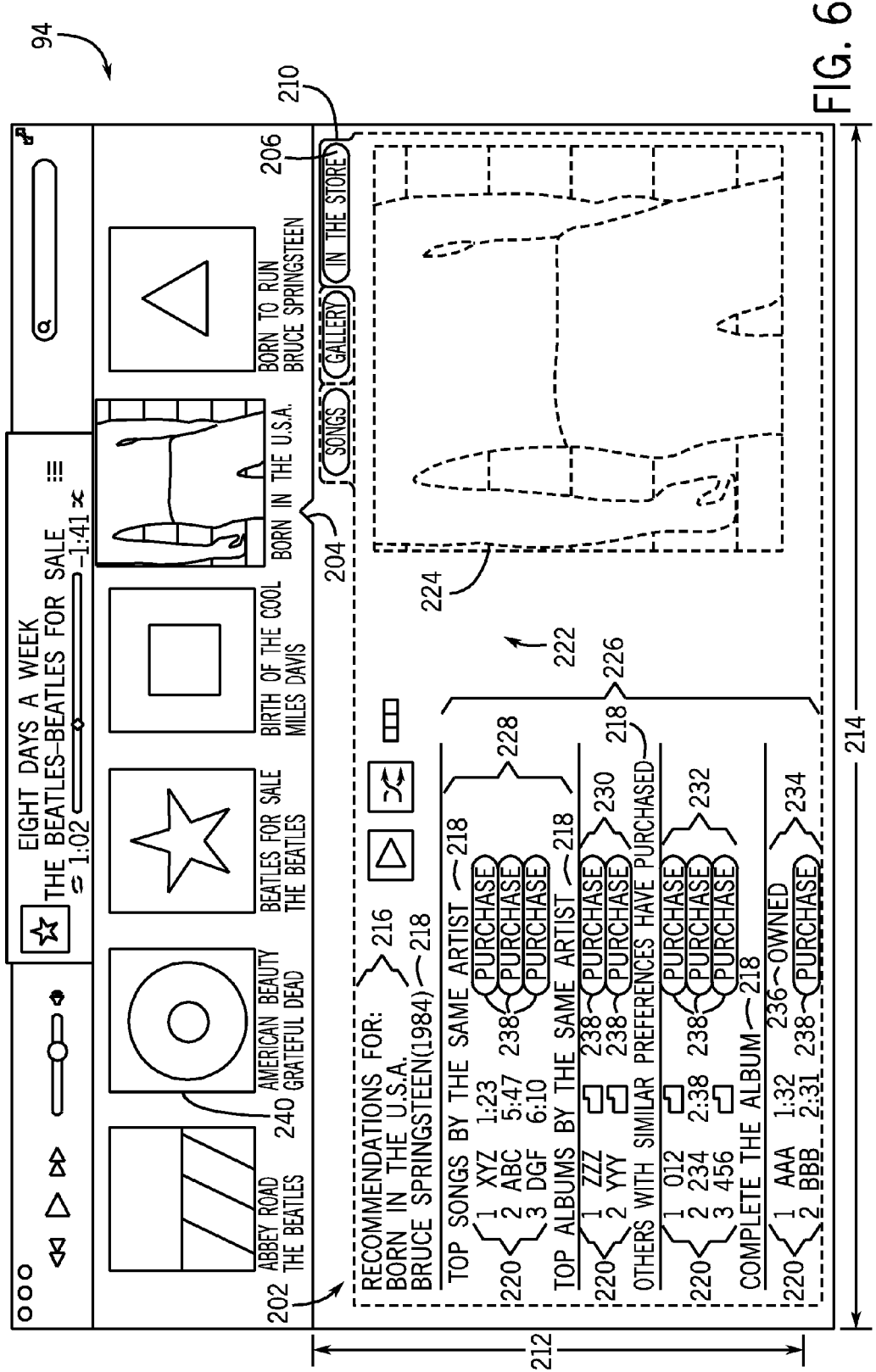
FIG. 6A illustrates an exemplary content player graphical user-interface with seamless user recommendations provided, in accordance with an embodiment.

FIG. 6A illustrates an example of a view of a content player 94 with integrated recommendations 202. As discussed above, the recommendations may be based upon a selection and/or content that is currently playing in the content player 94. For example, in the provided example, recommendations based upon a selection within the content player 94 are provided. As illustrated by the selector arrow 204, the user has selected "Born in the U.S.A.," in an album view, to obtain content information (e.g., acquired songs, album information, etc.). As illustrated, the user has selected an "In the store" button 206 or tab 210, which signals that recommendations based upon the album "Born in the U.S.A." The content player 94 may request formatted recommendations from a server, such as the iTunes® storefront (e.g., a service running on server 96 of FIG. 3). The storefront may provide a webpage or other data convertible into a view for the content player 94.

As discussed above, the recommendation page (e.g., page 108 of FIG. 3) may be formatted to fit within the content player 94, thus forming the integrated recommendations page 202. For example, when making the recommendation request, the content player 94 may provide a height 212 and/or a width 214 that the page should conform to when returning from the storefront. Additionally, primary text colors, secondary text colors, tertiary text colors, and background colors may be defined for primary text 216, secondary text 218, tertiary text 220, and background 222, respectively. As illustrated, primary text 216 may be a first level of text, with a higher level of prominence (e.g., an album title in the album view). Secondary text may include less prominent text on a secondary level (e.g., artist, album date, section headers, etc., in the album view). Tertiary text may be text on third level of prominence (e.g., secondary artists for the album, section body text, etc. in the album view). The page (e.g., recommendations page 202) may also be formatted with a background image 224 that may fade into the background of the page. The background image 224 may be dictated in the recommendation request by the content player 94 to the storefront. As illustrated, recommendations 226 may be displayed according to the layout defined in the recommendation request. The color scheme and background images 224 may be determined by the Application No.61/ 699,758 entitled "AUTOMATED GRAPHICAL USER-INTERFACE LAYOUT", filed September 11, 2012, which is herein incorporated by reference in its entirety.

The recommendations 226 may provide numerous types of recommendations. For example, as illustrated, in some embodiments, recommendations 226 are based upon top songs by the same artist, top albums by the same artist, content that other users have purchased based upon the currently selected content, and/or suggestions to complete a set of content. For example, based upon sending the artist Bruce Springsteen, the content player 94 has been sent recommendations 228, which are other popular songs by Bruce Springsteen. Additionally, recommendations 230, providing other popular albums by Bruce Springsteen, may be provided. In addition, the storefront and/or recommendation analyzer may obtain the purchase history of other users that have selected "Born in the U.S.A." and may provide recommendations 232 based upon this history. Further, a geography of the user and/or other characteristics of the user may be used to determine recommendations of content. Additionally, based upon a content library accessed by the content player 94, describing content owned and/or acquired by the user, the recommendations page 202 may include recommendations 234 for songs that may complete a collection (e.g., an album). As illustrated, in a complete the collection recommendation section, an indication 236 of already owned pieces of content in the collection may be provided. Further, the number and type of recommendations provided in the recommendation area 202 may be determined based upon the recommendation request provided by the content player 94, the type of selection that the recommendation is being made for (e.g., recommendations for an album view vs. an artist view), or the size allotted for the recommendation section 202. For example, when the space allotted for section 202 is small, the number of recommendations may be few. When the space allotted for section 202 is large, the number of recommendations may be many.

As may be understood from the discussion above, the content player 94 may be aware of content already owned and/or acquired by a user (e.g., by taking an inventory of a content library associated with the content player 94). Accordingly, in some embodiments, the recommendations 226 may make use of this information to only provide recommendations for content not already owned and/or acquired by the user. Because these recommendations have not been acquired by the user, a purchase option 238 may be provided in the recommendation area 202.

In alternative embodiments, recommendations may exclusively recommend content already acquired by the user or may recommend some content that has been acquired by the user and some content that has not been acquired by the user. Further, as may be appreciated, the content recommendations may change as new selections are made. For example, if an alternative album cover 240 is selected, the content recommendations based upon the album associated with cover 240 may be provided in the content player 94.

Additionally, the recommendations 226 may be cached, either locally to the client (e.g., client 92 of FIG. 3) hosting the content player 94, remotely on a server (e.g. server 96 of FIG. 3) providing the recommendations, or in remote storage. Accordingly, the processing power and network communication needed to determine recommendations may be reduced.

Figure 6B:
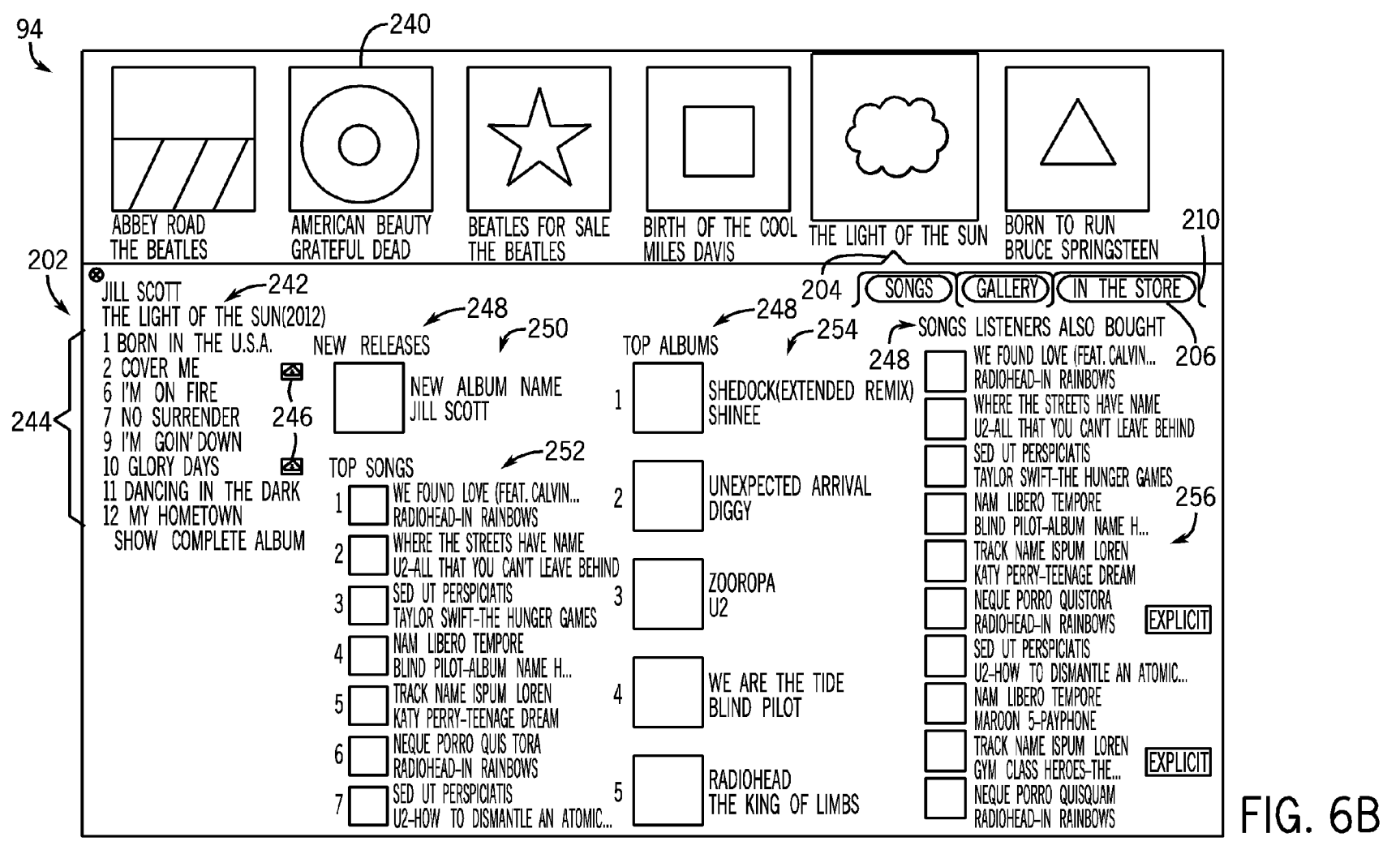

FIG. 6B is an alternative example of a view of a content player 94 with integrated recommendations 202. Similar to FIG. 6A, the user has selected an "In the store" button 206 or tab 210, which signals that recommendations based upon the album "The Light of the Sun" The content player 94 may request formatted recommendations from a server, such as the iTunes® storefront (e.g., a service running on server 96 of FIG. 3). The storefront may provide a webpage or other data convertible into a view for the content player 94.

The current view provides a sidebar 242 with content 244 already acquired by the user of the content player 94. Source indicators 246 may illustrate where the content 244 for is stored (e.g., in cloud-based storage). The view may include columns 248 with various sections of recommendations. For example, a new releases section 250 may be included that provides content or collections of content that have been recently released (or have most recently been released as compared to other content). The top content (e.g., "top songs") section 252 may provide songs or other content that user may desire to acquire based upon the user's activity in the content player 94, the current selections in the content player 94, or both. The top collections (e.g., "top albums") section 254 may provide albums or other collections of content that a user may desire to acquire based upon the user's activity in the content player 94, the current selections in the content player 94, or both. Additionally, a "content that others liked" (e.g., "Songs Listeners Also Bought") section 256 may provide content recommendations or collection recommendations based upon data relating to others based upon the current selections in the content player 94 and/or the user's actions in the content player 94.

Action menus may be provided in the content player GUI. The action menus may provide actions that may be performed on elements within the GUI. For example, one action may be the "In the store" recommendation functionality described above. FIGS. 7-18 illustrate various views within the GUI that illustrate the action menus.

Figure 7:
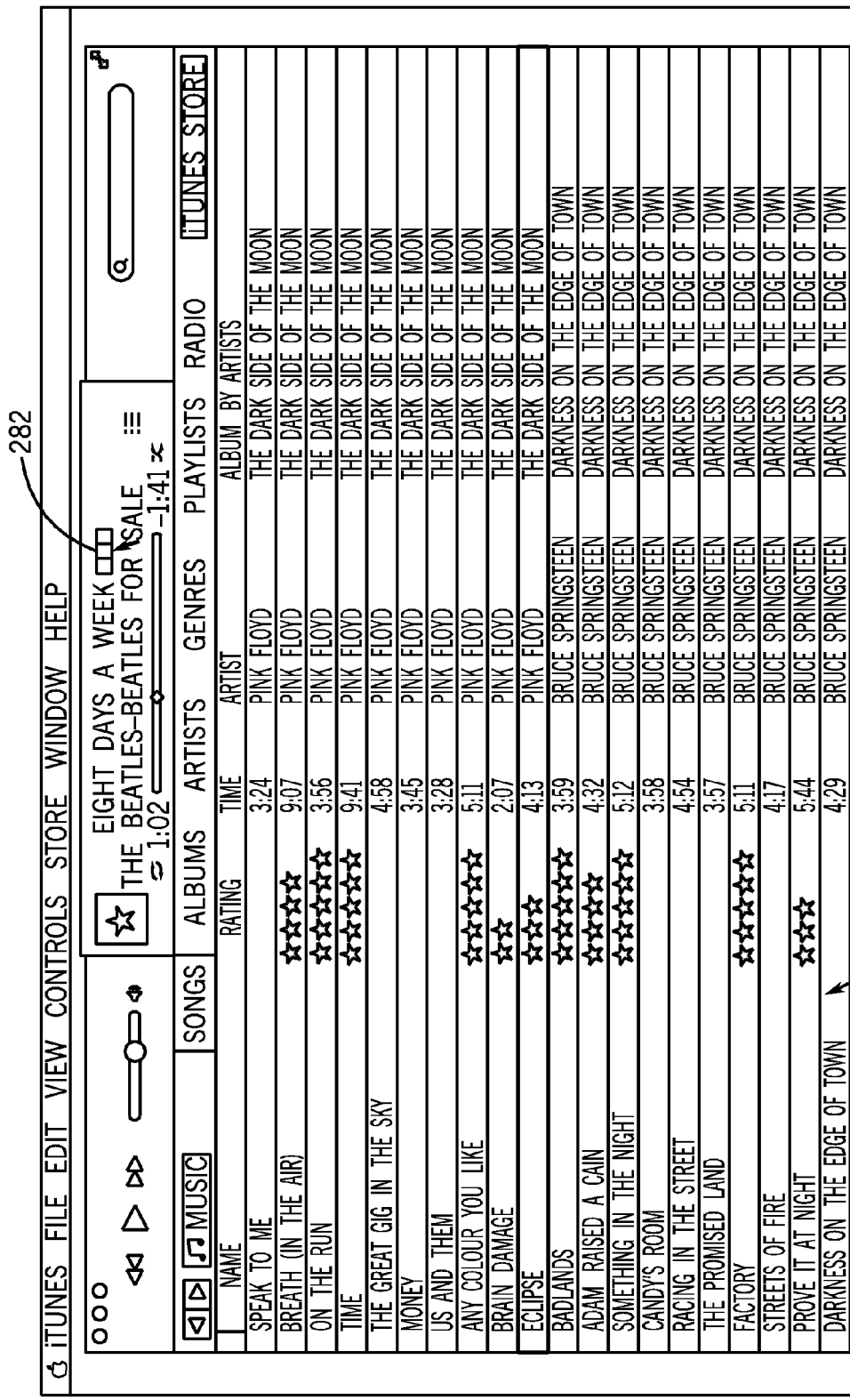
FIG. 7 is an example of a content player GUI with an action menu icon, in accordance with an embodiment.
Figure 8:
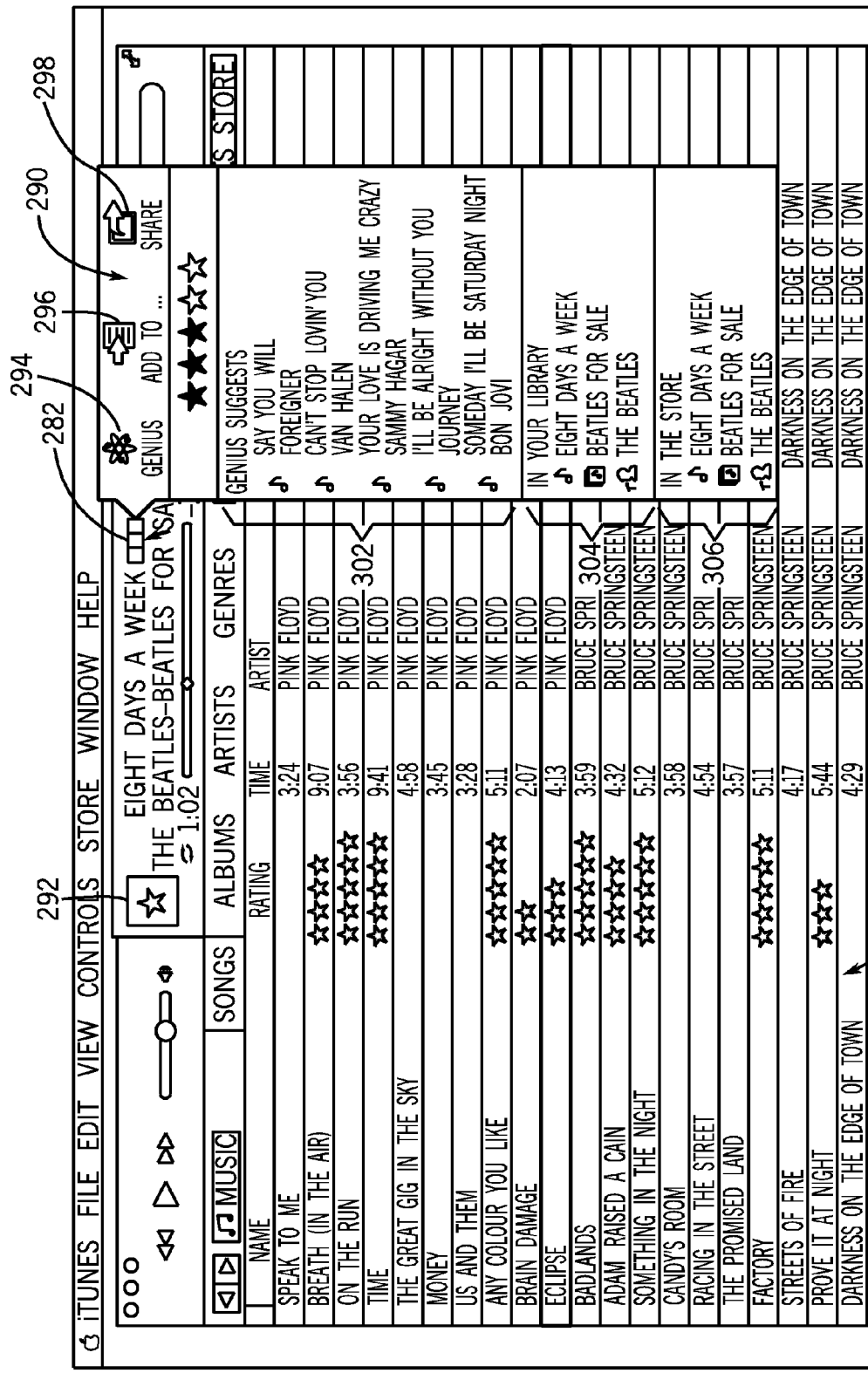
FIG. 8 is an example of a content player GUI with an action menu displayed at a song level in the "now playing" bar, in accordance with an embodiment.

FIG. 7 is an example of a content player GUI 280 with an action menu icon 282. As illustrated, action menus may be prepared for currently playing content. Further, the action menus may be generated for any selectable content within the GUI 280. When a user clicks the action menu icon 282, a generated action menu may be presented. FIG. 8 is an example of the content player GUI 280 with an action menu 290 presented at a song level in the "now playing" bar 292, in accordance with an embodiment. The action menu 290 may include main menu buttons. For example, in the current embodiment, the action menu 290 includes a Genius button 294, an Add To . . . button 296, and a Share button 298. Further, the action menu may include a rating bar 300, a Genius suggests section 302, an In your Library section 304, and a n In the Store section 306.

The Genius button 294 may be used to . . . The Add To button 296 may be used to . . . The Share button 298 may be used to . . . The Genius Suggests section 302 may be used to present Genius® selections to users based upon the currently playing content. The In Your Library section 304 may be used to present content recommendations from the user's library based upon the currently playing content. The In the Store section 306 may present recommendations of content not in the user's library that is available in the storefront, based upon the currently playing content.

Figure 9:
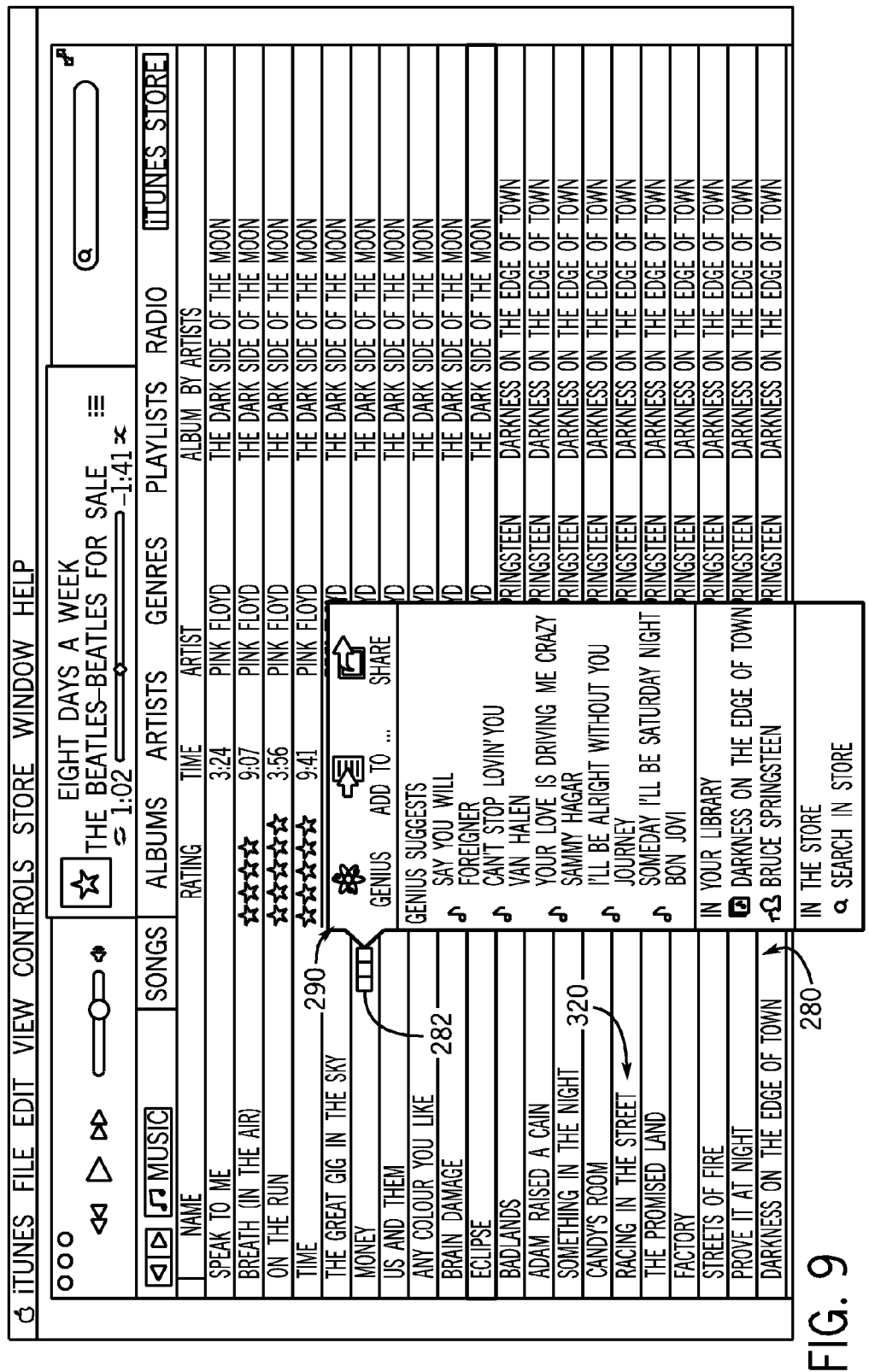
FIG. 9 is an example of a content player GUI with an action menu displayed at the song level in a library, in accordance with an embodiment.
Figure 10:
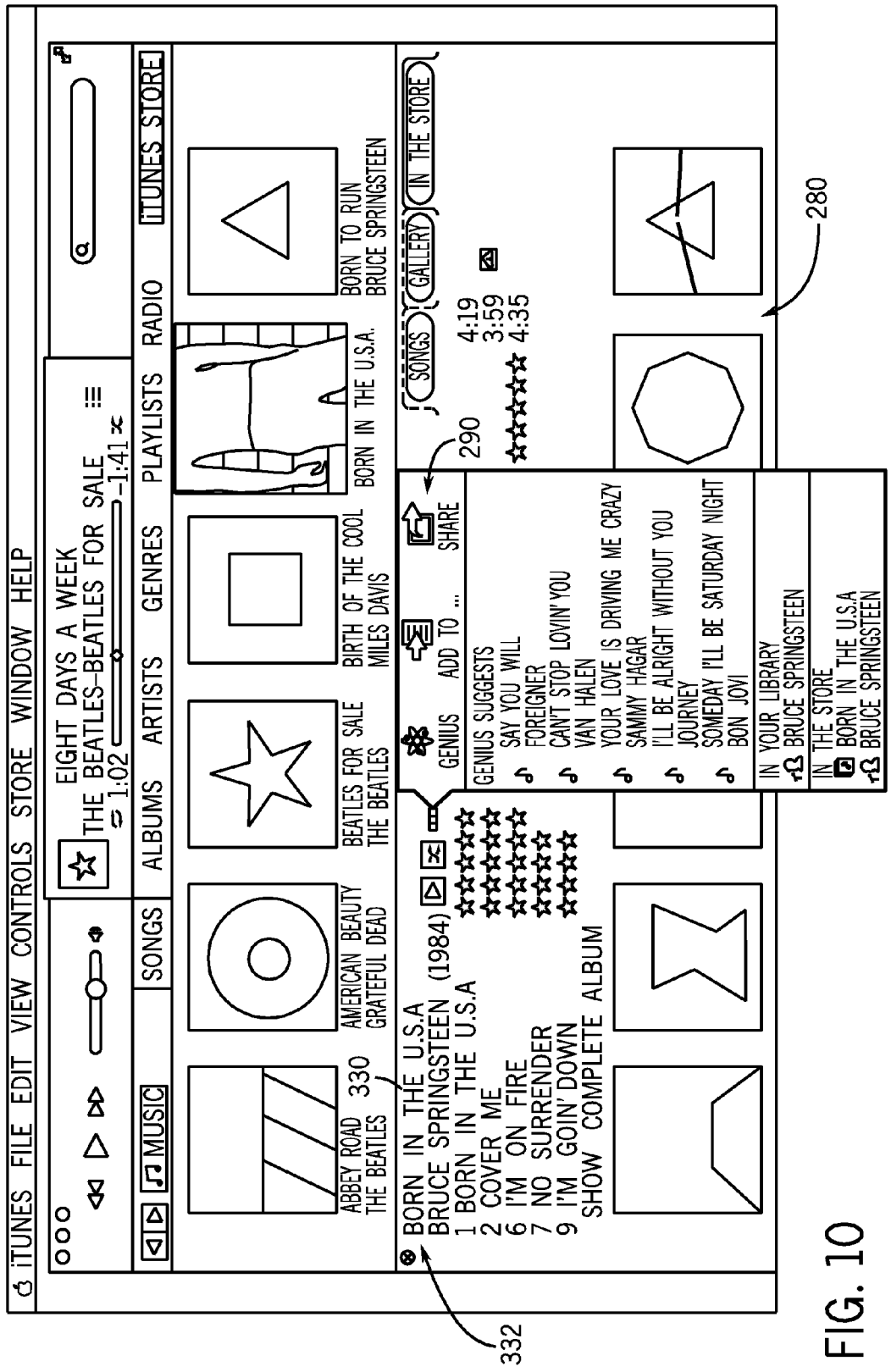
FIG. 10 is an example of a content player GUI with an action menu displayed at the album level, in accordance with an embodiment.
Figure 11:
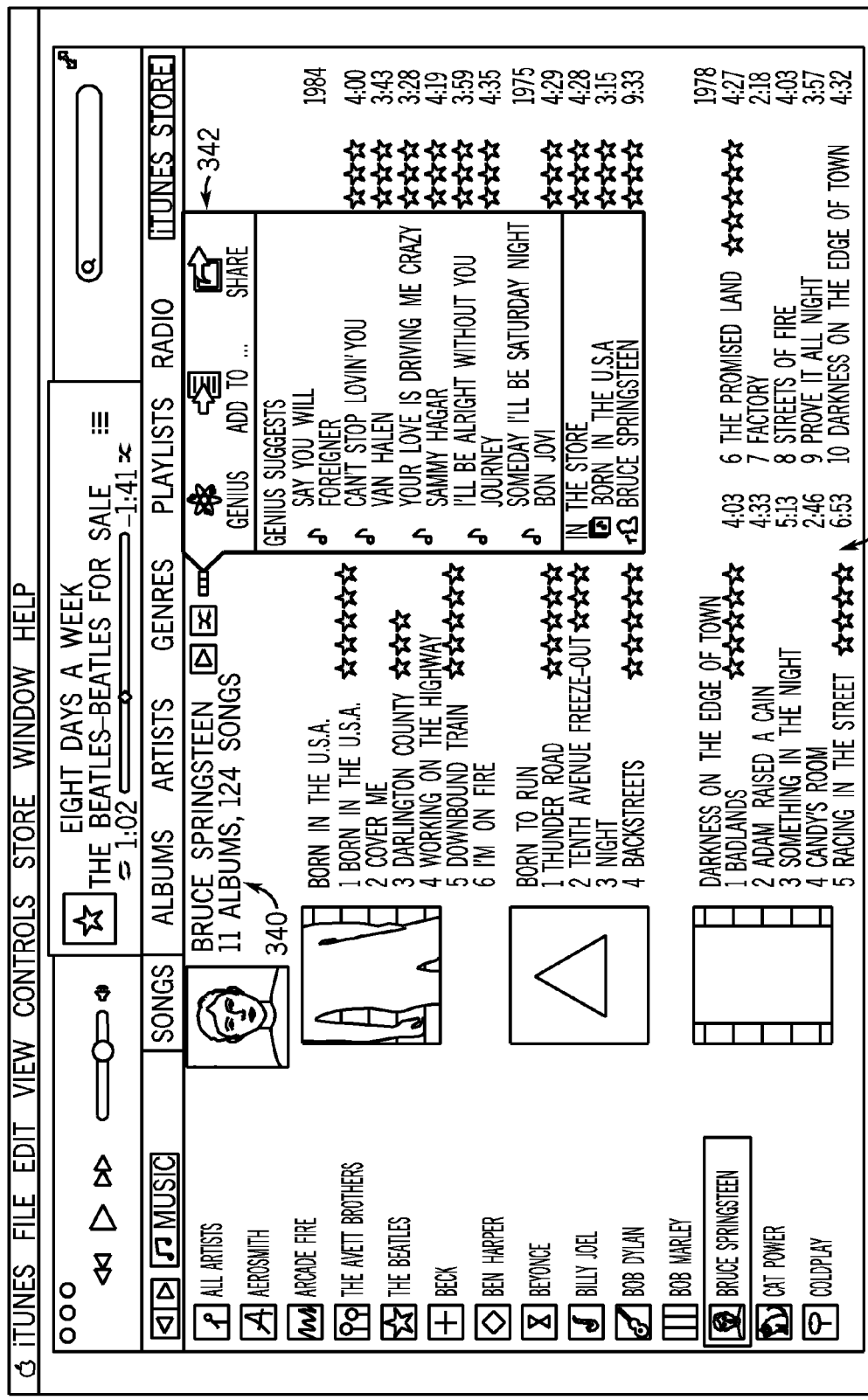
FIG. 11 is an example of a content player GUI with an action menu displayed at the artist level, in accordance with an embodiment.
Figure 12:
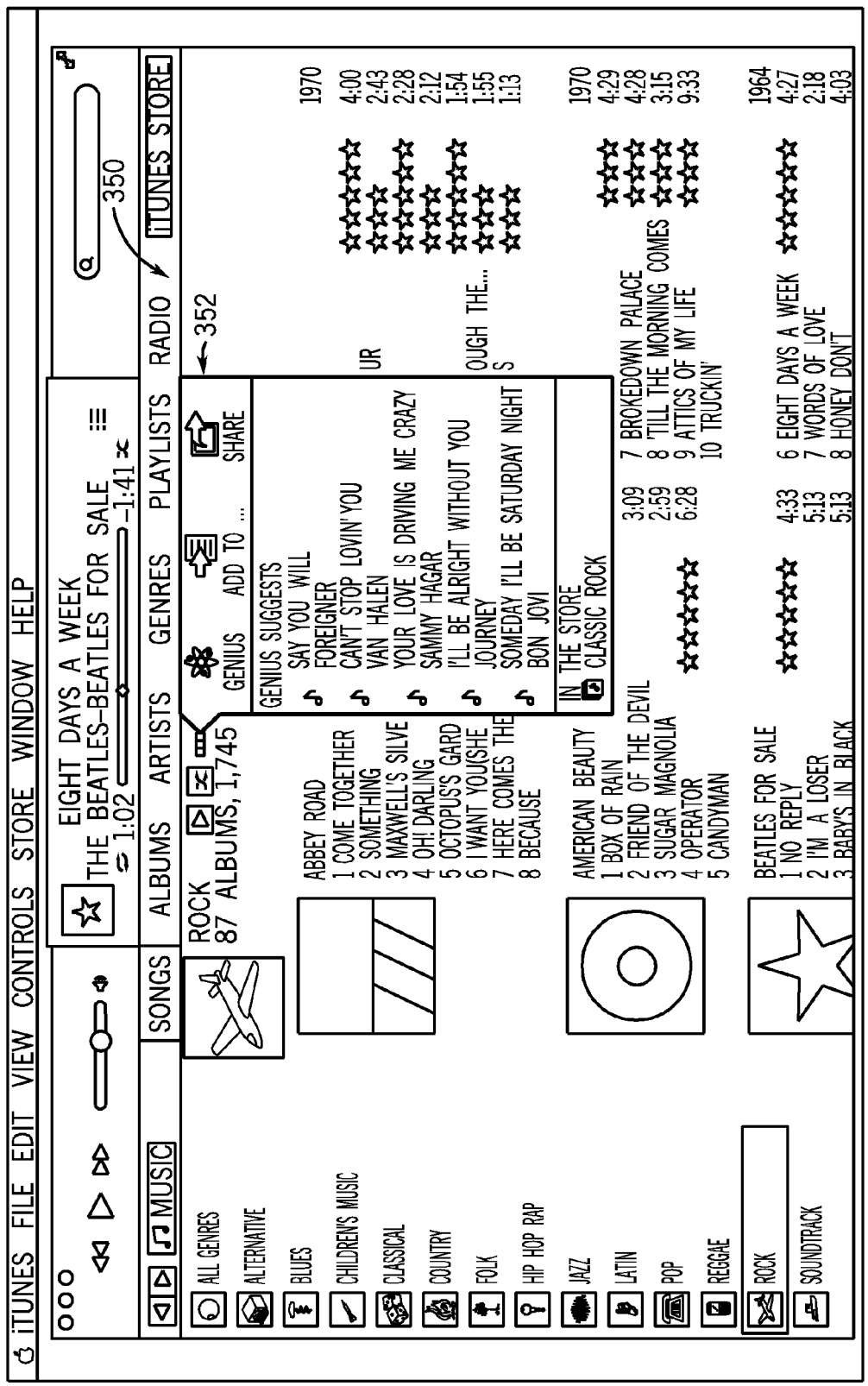
FIG. 12 is an example of a content player GUI with an action menu at the genre level, in accordance with an embodiment.

The action menus 290 are not limited to currently playing content. FIG. 9 is an example of the content player GUI 280 with an action menu 290 displayed at the song level 320 in a library, in accordance with an embodiment. An action menu icon 282 is placed at the song level 320, and when selected the action menu 290 is displayed. FIG. 10 is an example of a content player GUI 280 with an action menu displayed in a detail view 330 at the album level 332, in accordance with an embodiment. FIG. 11 is an example of the content player GUI 280 with an action menu 290 displayed in an artist detail view 340 at the artist level 342, in accordance with an embodiment. FIG. 12 is an example of the content player GUI 280 with an action menu 290 in the detailed genre view 350 at the genre level 352, in accordance with an embodiment.

Figure 13:
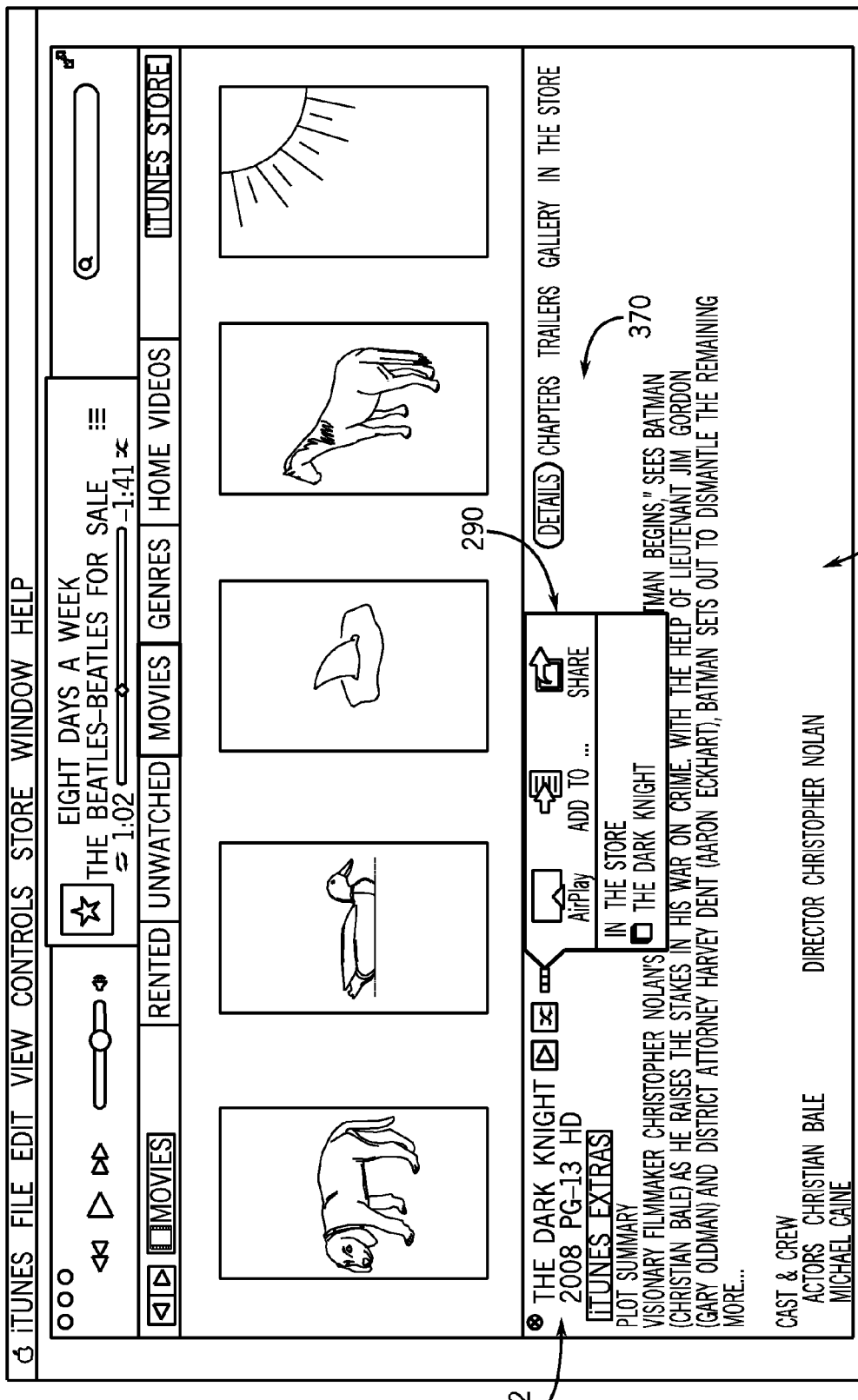
FIG. 13 is an example of a content player GUI with an action menu at the title level of a movie, in accordance with an embodiment.
Figure 14:
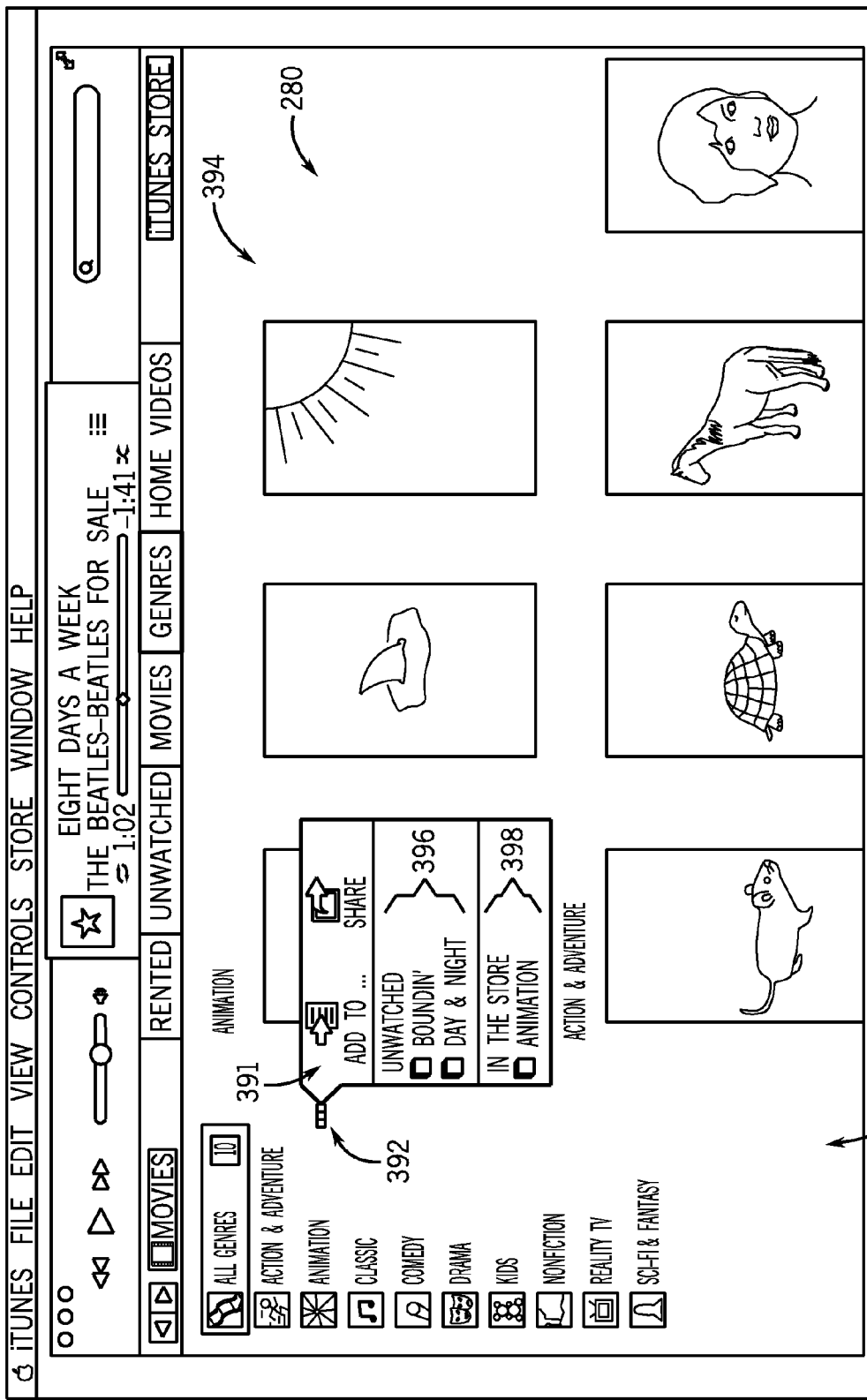
FIG. 14 is an example of a content player GUI with an action menu at the genre level of a movie view in a sidebar, in accordance with an embodiment.
Figure 15:
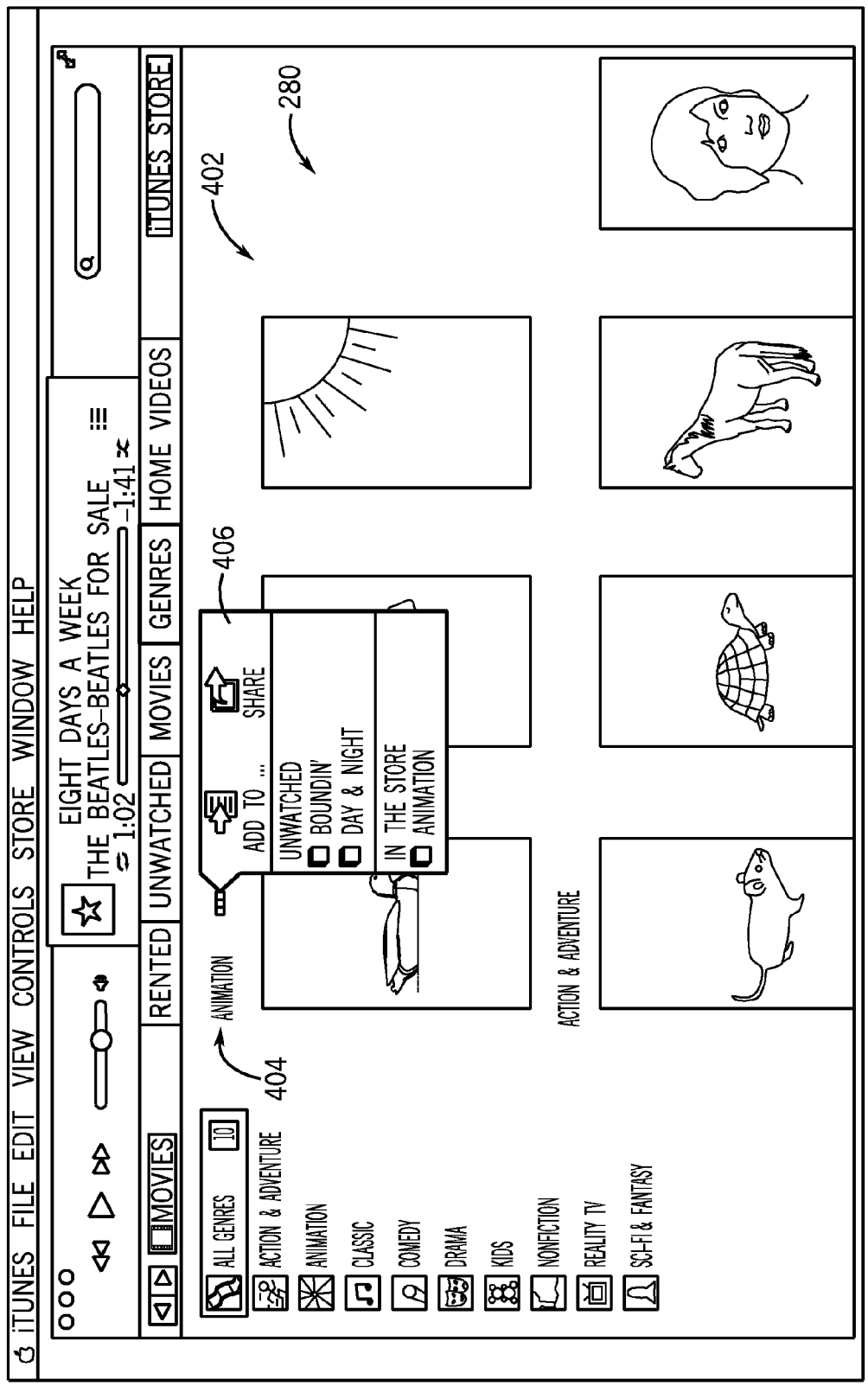
FIG. 15 is an example of a content player GUI with an action menu at the genre level of a movie in a top bar, in accordance with an embodiment.
Figure 16:
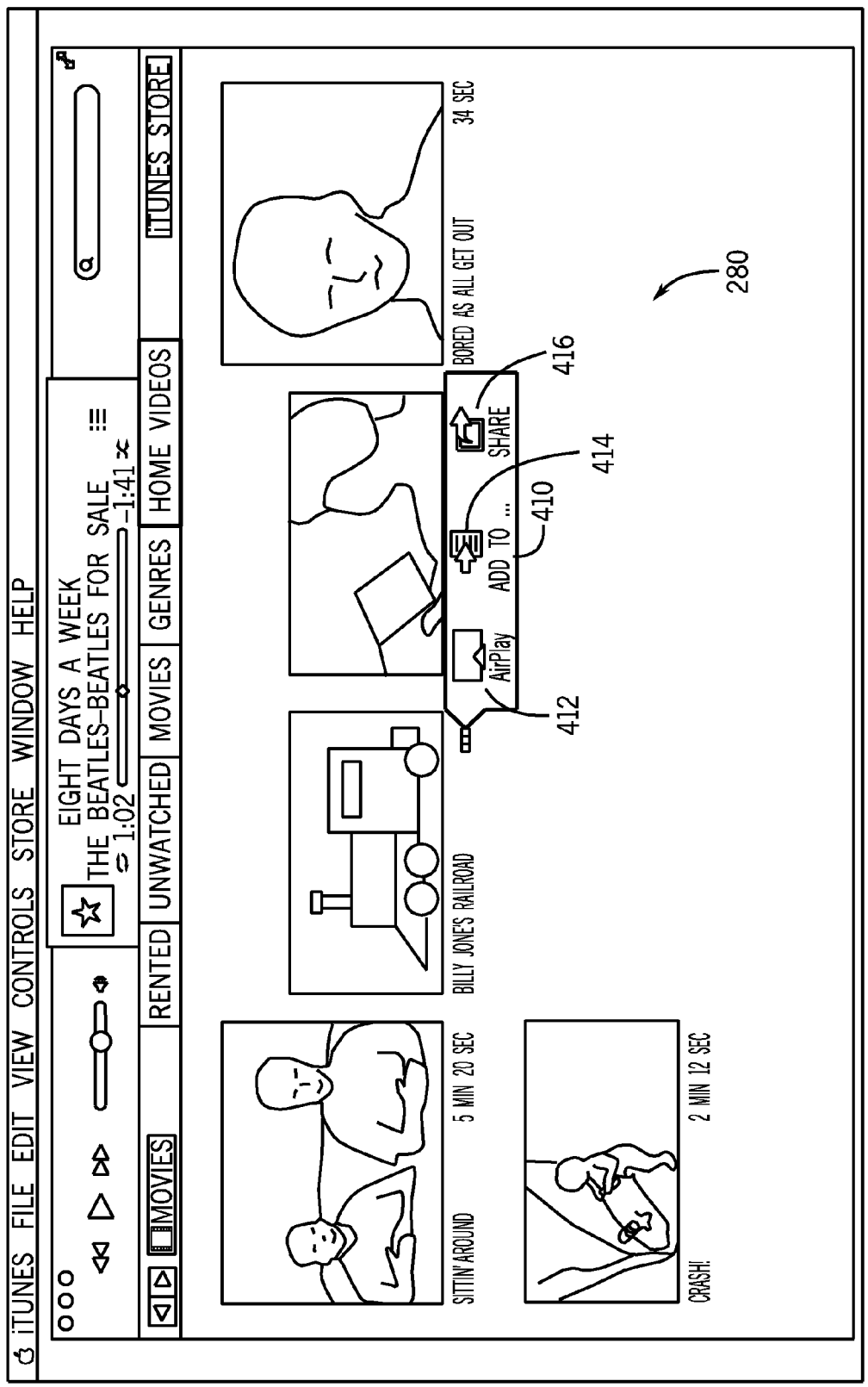
FIG. 16 is an example of a content player GUI with an action menu at the title level of a movie in an icon view, in accordance with an embodiment.
Figure 17:
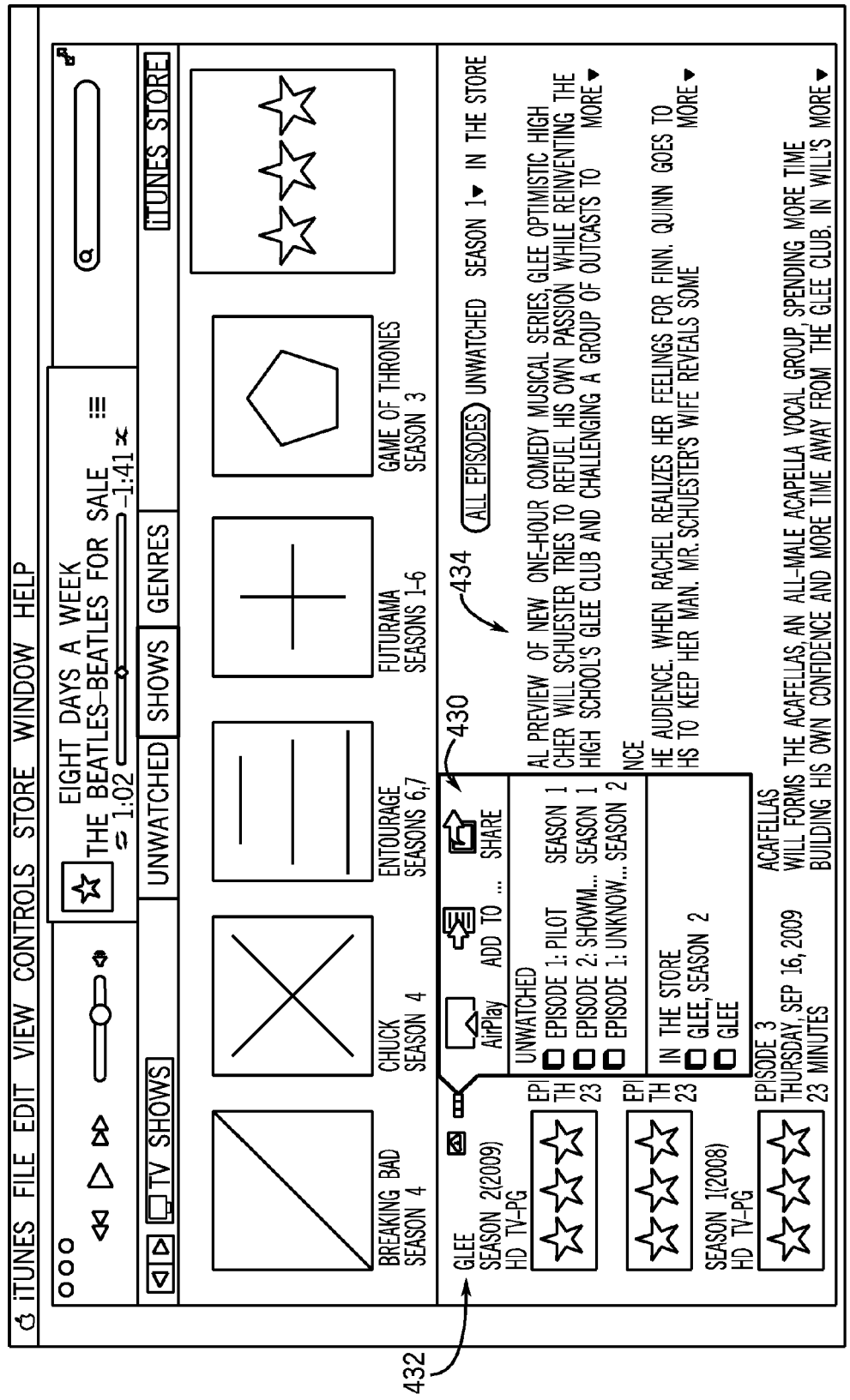
FIG. 17 is an example of a content player GUI with an action menu at the title level of a TV series view, in accordance with an embodiment.
Figure 18:
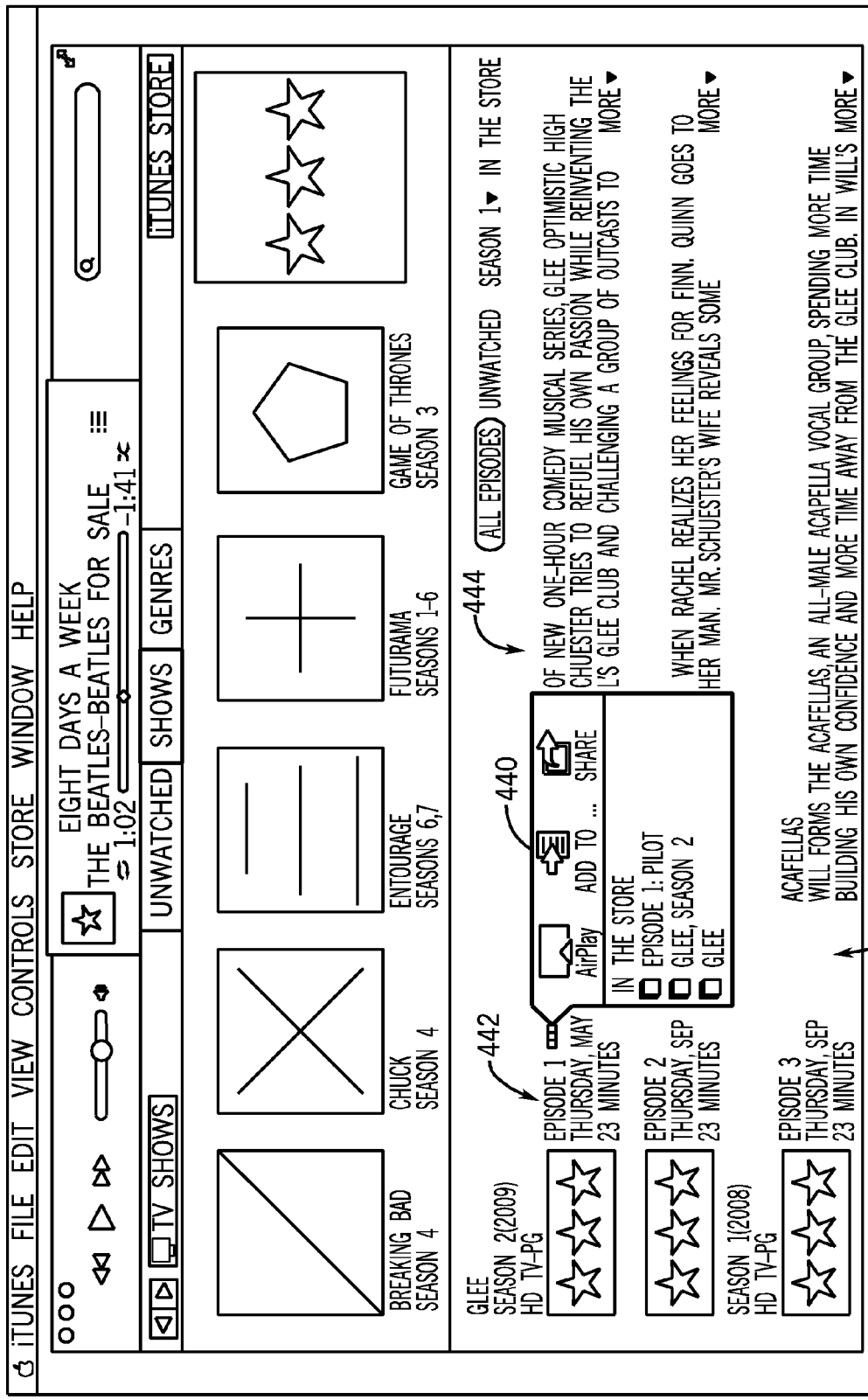
FIG. 18 is an example of a content player GUI with an action menu at the episode level of a TV series view, in accordance with an embodiment.

While the action menus 290 have been illustrated in a music context of the content players, the action menus 290 are not limited to such content. FIG. 13 is an example of a content player GUI 280 with an action menu 290 displayed on a movie detail view 370 at the title level 372 of a movie, in accordance with an embodiment. As illustrated, the action menu 290 may be modified from the music action menus. For example, if Genius® recommendations are not available, the Genius button and Genius Suggests sections may be removed. FIG. 14 is an example of the content player GUI 280 with a genre sidebar 390 with an action menu 391 at the genre level 392 of a movie view 394, in accordance with an embodiment. Action bar 391 may include an unwatched section 396 and an In the Store section 398. The unwatched section 396 may make recommendations of content found in the library that is related to the selected genre (e.g., "Classic") that has not been watched. As discussed above, the In the Store section 398 may recommend content in a storefront that is not in the user's library based at least in part upon the current level of the action menu (e.g., genre level 392, here illustrated as "Classic"). FIG. 15 is an example of a content player GUI 280 with an action menu 400 on a genre detail view 402 at the genre level 404 of a movie, in accordance with an embodiment. When no recommendations are available, the action menu may be abbreviated. FIG. 16 is an example of a content player GUI 280 with an abbreviated action menu 410 caused by no recommendations being available for the selected content. As illustrated, the action menu 410 does not have the In the Store or Genius Suggests sections. The abbreviated menu includes an AirPlay button 412, that enables wireless content playback using Airplay® technology. Further, the abbreviated menu 410 may include an Add to . . . button 414 and a Share button 416. As will be discussed in more detail below, the Add to . . . button 414 may enable content to be added to a device that is communicatively coupled to the content player or to a playlist within the content player. The Share button 416 may enable the content to be shared (e.g., with other electronic devices, content players, etc.). FIG. 17 is an example of the content player GUI 290 with an action menu 430 at the title level 432 of a TV series view 434, in accordance with an embodiment. FIG. 18 is an example of the content player GUI 280 with an action menu 440 at the episode level 442 of a TV series view 444, in accordance with an embodiment.

Figure 19A:
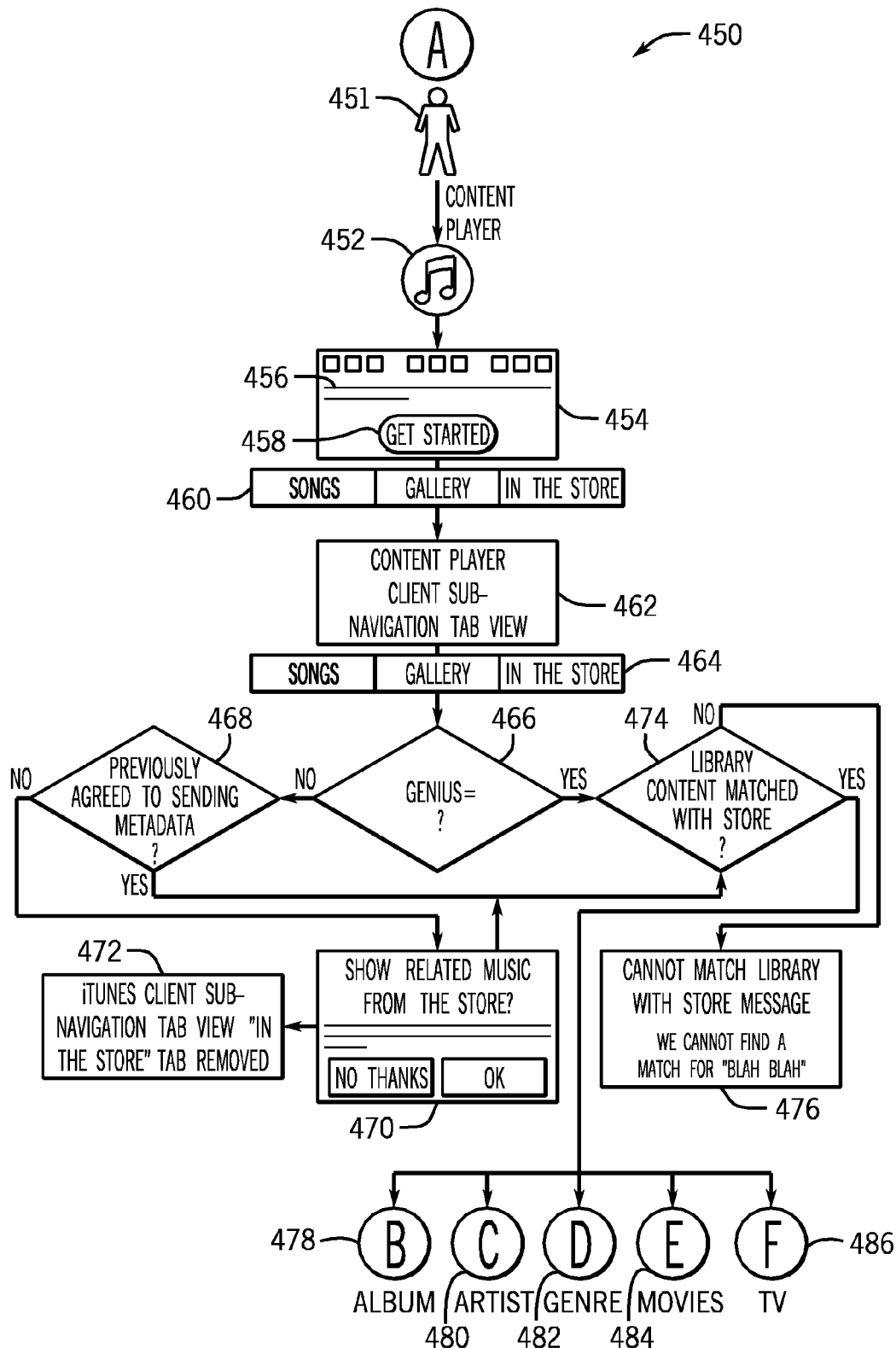

FIGS. 19A-G provide an example of a flow for an in the store recommendation system, in accordance with an embodiment. The various views depict process flows for making in store recommendations based at least in part upon user settings in the content player. FIG. 19A illustrates a user 451 launching the content player 452. A welcome page 454 may be provided to the user 451 with a checkbox 456 pre-selected, where the checkbox 456 authorizes the content player 452 to collect and send information to a recommendation service for content recommendations. The user 451 may then select a "get started" button 458, either leaving the checkbox 456 checked or unchecking the checkbox 456. The user 451 may navigate to a particular content type (e.g., "songs" 460). The user 451 is provided a sub-navigation tab 462 where an "In the Store" tab 464 may be selected by the user 451. When recommendation services 466 (e.g., Genius® by Apple, Inc.) that tailor recommendations for a particular user by monitoring attributes of the user 451 are not active, the system may determine if the user 451 previously agreed to send metadata (decision block 468). If the user 451 has not agreed to send metadata, a prompt 470 to allow transmission of metadata is provided to the user 451. If the user 451 does not allow the transmission, the recommendations tab (e.g. "In the Store" tab 464) may be removed (block 472). When the user 451 does allow the transmission or the recommendation services 466 are active, the system may determine if library content (e.g., the seed data for making the recommendations) can be matched with content available to the recommendation services (e.g., the storefront) (decision block 474). If the content does not match content available to the recommendation services, a page 476 may be provided that notifies the user 451 than no recommendations are available for the selected content. When the content can be matched to content known by the recommendation services, the recommendations may be provided according to the type of content for the seed data (e.g., the data that the recommendations are based upon). For example, the recommendations may be based on an album recommendations process 478, an artist recommendations process 480, a genre recommendations process 482, a movies recommendation process 484, and/or a television recommendations process 486.

FIG. 19B provides an example of an album recommendations process 478. The user 451 may be provided a recommendations view 488 (e.g., similar to the view of content player 94 of FIG. 6A or 6B) based upon a selected album. For example, in the current embodiment, in view 488, a "Featured" bubble 490 and a recommended songs section 492 may be provided in a first column 494. Further, a second column 496 may include a recommended albums section 498. A third column 500 may include a new releases section 502.

The Featured Bubble 490 may include top priority recommendations. For example, this Featured Bubble 490 may provide Pre-order content 504, which may be content that is not yet released for acquisition by the user 451. If no preorder information is available, new releases 506 may be provided, which may be the latest releases by the artist associated with the album selected. If no new releases are available, "complete my album" recommendations 508 may be provided. These recommendations 508 may be determined by analyzing incomplete collections (e.g., partial album acquisition) and providing content that will complete the collection. If no "complete my album" recommendations 508 are available and no other high priority recommendations (e.g., recommendations 504 and 506) are available, the Featured Bubble 494 may be removed (block 510).

Recommendations for the recommended songs section 492 may be provided based upon whether the recommendation service 466 is active and/or the user 451 is signed into a storefront such that a purchase history for the user 451 is available. For example, when the recommendation service 466 (e.g., Genius®) is active and the user 451 is signed in, the songs may be personalized recommendations based upon the selected album's songs, excluding songs already in the user's library and/or already purchased, because the recommendation services 466 can provide personalized results and the storefront may provide content already purchased by the user 451 (block 512). When the recommendation service 466 is active and the user is signed out, the songs may be personalized recommendations based upon the selected album's songs, excluding any songs the user 451 already has in their library, because the recommendation services 466 may keep track of content stored in the user's library, but transaction history of the user 451 may not be available because the user 451 is not signed in (block 514). When the recommendation services 466 are not active and the user 451 is signed in, the recommended songs may be based on content other customers have bought (e.g., non-personalized) based on the songs from the album that user 451 is viewing, excluding songs the user has already purchased, because the recommendation service 466 is not available to make personalized recommendations, but the transaction history for the user 451 is available because the user 451 is signed into the storefront (block 516). When the recommendation services 466 are off and the user 451 is not signed in, the song recommendations may be based on songs other customers have bought based upon the songs from the selected album, because the recommendation services 466 are not available to make personalized recommendations and information about the user's library and transaction history is not available from the recommendation services 466 and/or the user being signed in to the storefront (block 520).

The recommended albums section 498 may also provide different recommendations based upon whether the recommendation services 466 are active and the user is signed in to a storefront. When the user 451 is signed in and the recommendation services 466 are active the recommended albums may be personalized recommendations based upon the selected album, excluding albums the user 451 already has in their library and/or has already purchased, because the recommendation services 466 are available to make personalized recommendations and provide information about the user's library and the transaction history of the user 451 is available because the user 451 is signed into the storefront (block 522). When the recommendation services 466 are active and the user 451 is signed out, the recommendations may be personalized recommendations based upon the selected album, excluding albums the user 451 already has in their library, because the recommendation services 466 may provide personalized recommendations based upon knowledge of what is in the user's library, but the purchase history of the user 451 is not available because the user 451 is not signed into the storefront (block 524). When the recommendation services 466 are not active and the user 451 is signed in, the recommendations may be based upon albums bought by other customers based upon the selected album, excluding albums the user 451 has already purchased, because personalized recommendations are not available from the recommendation services 466, but purchase history of the user 451 is available because the user 451 is signed into the storefront (block 526). When the recommendation services 466 are not active and the user 451 is signed out, the album recommendations may be based on albums other customers have bought based upon the selected album, because the recommendation services 466 are not available to provide personalized recommendations and information regarding the user's library and purchase history is not available because the user 451 is not signed into the storefront (block 528).

The new releases section 502 may provide recommendations in a similar manner, except that personalized recommendations may not be applicable. For example, new releases of an artist or genre will be new releases regardless of personalized preferences or what other customers have bought. Accordingly, the recommendation services may not affect personalization of new releases, other than to exclude recommending content already in the user's library (because the recommendation services, when active, may provide information regarding what is already in the user's library). For example. when the recommendation services 466 are active and the user 451 is signed in, the new release recommendations may be provided by showing, in a first slot, new releases from the artist of the album selected when the new release is not in the featured bubble 490. Additional new releases within the selected album's genre may be provided in the remaining slots, excluding albums the user 451 already has in their library and/or have purchased (block 530). If no new releases exist for the selected artist, then new releases for the genre of the album selected, excluding albums the user 451 already has in their library and/or have already purchases may be provided (block 532). When the recommendation services 466 are active but the user 451 is not signed in, the first slot may be filled with a new release from the artist of the album selected (if not in the featured bubble 490) and the new releases within the selected album's genre may fill the additional slots, excluding any albums the user 451 already has in their library (block 534). If no new releases exist for the selected artist, then new releases for the genre of the album selected, excluding any albums the user 451 already has in their library, may be provided (block 536). When the recommendation services 466 are off and the user 451 is signed in, the first slot may be filled with a new release from the artist of the album selected (if not already in the featured bubble 490). The additional slots may be filled with new releases within the selected album's genre, excluding albums the user 451 already has in their library (block 538). If no new releases exist for the selected artist, new releases for the genre of the album selected may be provided, excluding any albums the user 451 has already purchased (block 540). When the recommendation services 466 are not active and the user 451 is signed out, the first slot may be filled with a new release from the artist of the album selected, if not already in the featured bubble 490. The additional slots may be filled with new releases within the selected album's genre (block 542). When no new releases exist for the selected artist, new releases for the genre of the album selected may be provided (block 544).

FIG. 19C illustrates a layout for artist recommendations view 550 that may occur when recommendations are requested by the user 451 while viewing an artist's page. As with the album recommendations view 488, the view may include, a "Featured" bubble 490 and a recommended songs section 492 in a first column 494. Further, a second column 496, may include a recommended albums section 498. A third column 500 may include a new releases section 502. Recommendations in this view 550 are determined in a similar fashion as recommendations for the view 488, except the seed for the recommendations is the selected artist instead of the selected album. For example, the featured bubble prioritizations (blocks 552, 554, 556, and 558) are all the same except that the seed is a selected artist rather than a selected album. In a similar fashion to the recommendations made for view 488, the status of the recommendation services 466 and whether the user 451 is signed in may affect the recommendations. When the recommendation services 466 are active (blocks 560, 562, 568, 570, 578, 582), the recommendations may be personalized using the recommendation services 466 for the user 451, when applicable (e.g., when preferences of a user may be useful in making the recommendation). The recommendation services 466 may monitor the user's interaction with content and/or the user's content library, providing more personalized recommendations. Further, content may be excluded based upon what is in the user's library. When the recommendation services 466 are not active, the recommendations may be non-personalized, relying on data regarding other users' acquisition, when applicable (blocks 566, 574). Content may not be excluded based upon what is in the user's library when information regarding the user's library is unavailable. Further, when the user 451 is signed in (blocks 560, 564, 568, 572, 576, 578, 584, 586, 594, 596, 602, and 604) content purchased by the user 451 may be excluded from the recommendations.

A "more albums by this artist or similar artists" bar 592 may be provided in the view 550. This bar 592 may provide albums by the selected artist. Depending on whether the user 451 is signed in and the recommendation services 466 are active, the recommended albums may be limited to those not in the user's library or purchased by the user (blocks 594, 596, 598, 600, 602, 604, 606, 608).

FIG. 19D illustrates a layout for genre recommendations view 620 that may occur when recommendations are requested by the user 451 while viewing a genre page. As with the album and artist recommendations views 488 and 620, the view 620 may include, a Featured Bubble 490 and a recommended songs section 492 in a first column 494. Further, a second column 496, may include a recommended albums section 498. A third column 500 may include a new releases section 502. Recommendations in this view 620 are determined in a similar fashion as recommendations for the views 488 and 550, except the seed for the recommendations is the selected genre instead of the selected album or artist. For example, the featured bubble prioritizations (blocks 622, 624, 626, and 628) are all the same except that the seed is a selected genre (e.g., "rock") rather than a selected album or artist. In a similar fashion to the recommendations made for views 488 and 550, the status of the recommendation services 466 and whether the user 451 is signed in may affect the recommendations. When the recommendation services 466 are active (blocks 630, 632, 638, 640, 646, 648, 656, 658), the recommendations may be made using the recommendation services 466 for the user 451, when applicable (e.g., when a user preference is useful for making a recommendation). The recommendation services 466 may monitor the user's interaction with content and/or the user's content library, and thus may provide more personalized recommendations, excluding content that is already in the user's library. Otherwise, data from other user's acquisition may be used, when applicable (e.g., when a user's preferences may be useful for making a recommendation) and content already in the user's library may not be excluded (blocks 566, 574). Further, when the user 451 is signed in (blocks 630, 634, 638, 642, 646, 650, 656, 660) content purchased by the user 451 may be excluded from the recommendations.

A "more albums from this genre" bar 654 may be provided in the view 620. This bar 654 may provide albums that are of a common genre with the selected genre. Depending on whether the user 451 is signed in and the recommendation services 466 are active, the recommended albums may be limited to those not in the user's library or purchased by the user (blocks 656, 658, 660, 662).

Figure 19E:
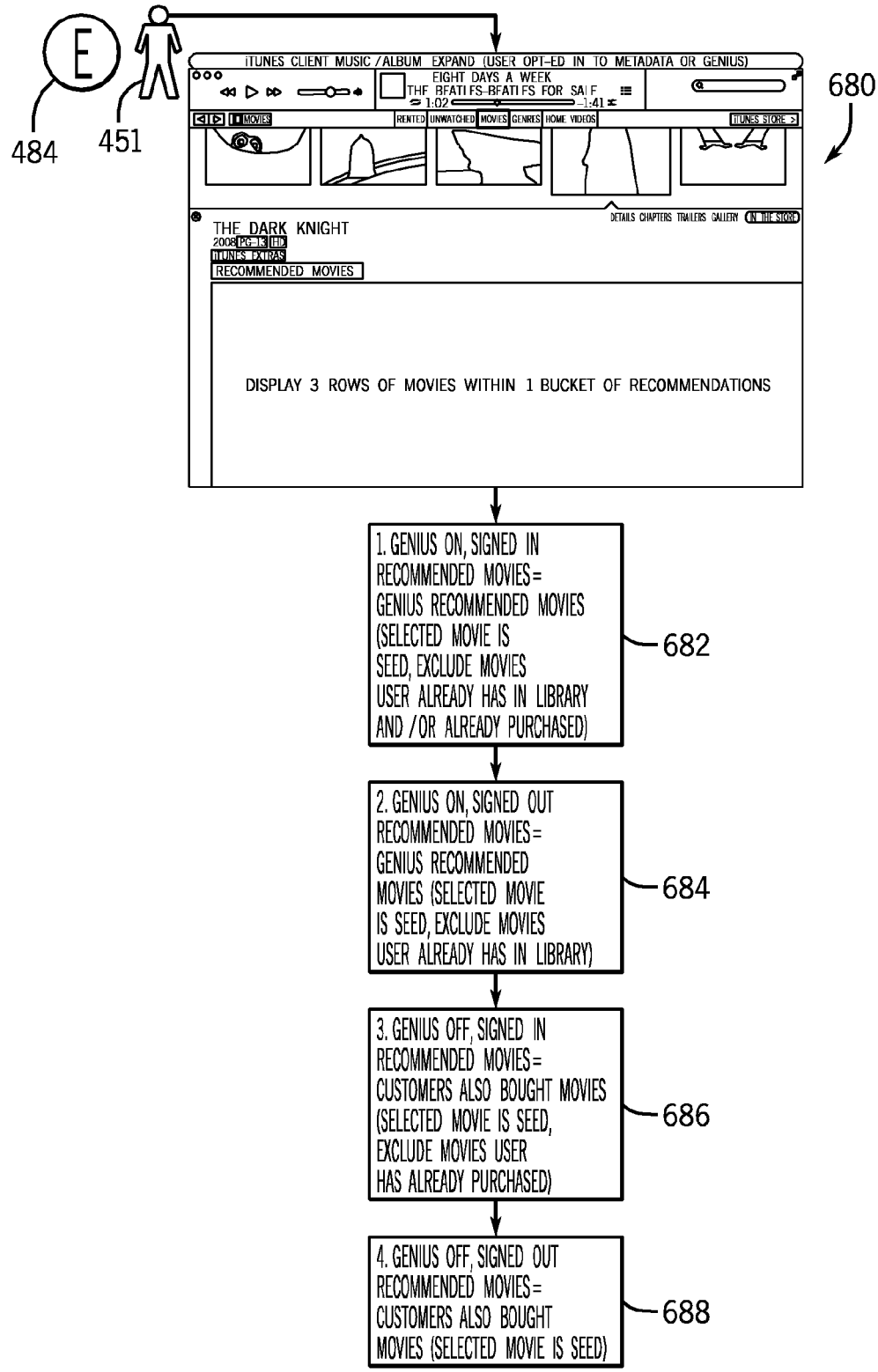

FIG. 19E illustrates a process 484 for providing movie recommendations view 680. The movie recommendations view 680 may provide recommendations via the recommendations services 466 when active (blocks 682 and 684) based upon the selected movie (e.g., "The Dark Knight"). When not active (blocks 686 and 688), the recommendations may be based upon the purchase history of other users based upon the selected movie (e.g., "The Dark Knight"). Further, when the user 451 is signed in (blocks 682 and 686), the recommendations may exclude content already purchased by the user. Otherwise, the content may be excluded based upon what is in the user's library (block 684) or not at all (block 688).

Figure 19F:
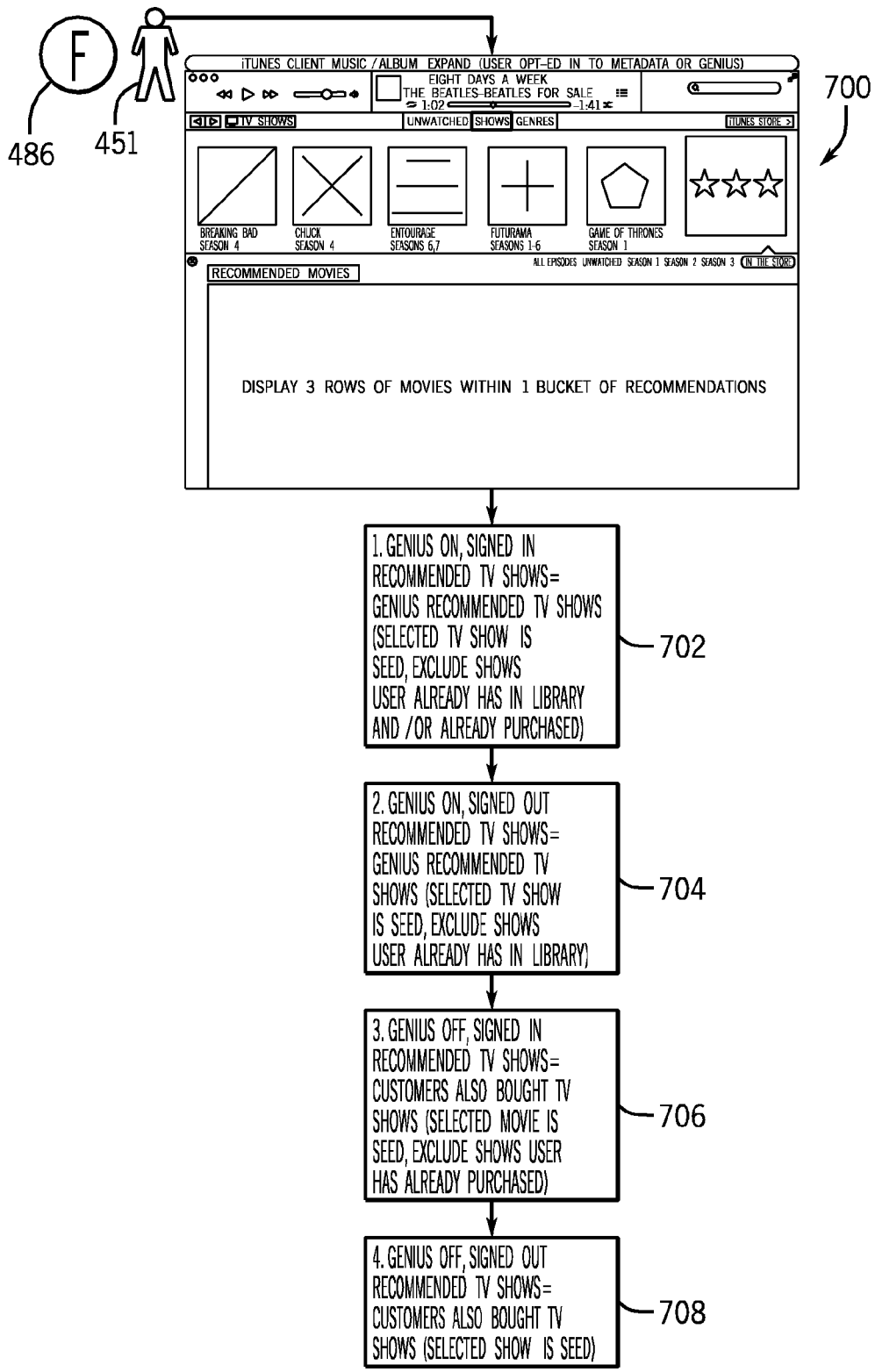

FIG. 19F illustrates a process 486 for providing television recommendations view 700. The television recommendations view 700 may provide recommendations via the recommendations services 466 when active (blocks 702 and 704) based upon the selected television show or series (e.g., "Glee"). When not active (blocks 706 and 708), the recommendations may be based upon the purchase history of other users based upon the selected television show or series (e.g., "Glee"). Further, when the user 451 is signed in (blocks 702 and 706), the recommendations may exclude content already purchased by the user. Otherwise, the content may be excluded based upon what is in the user's library (block 704) or not at all (block 708).

Figure 19G:
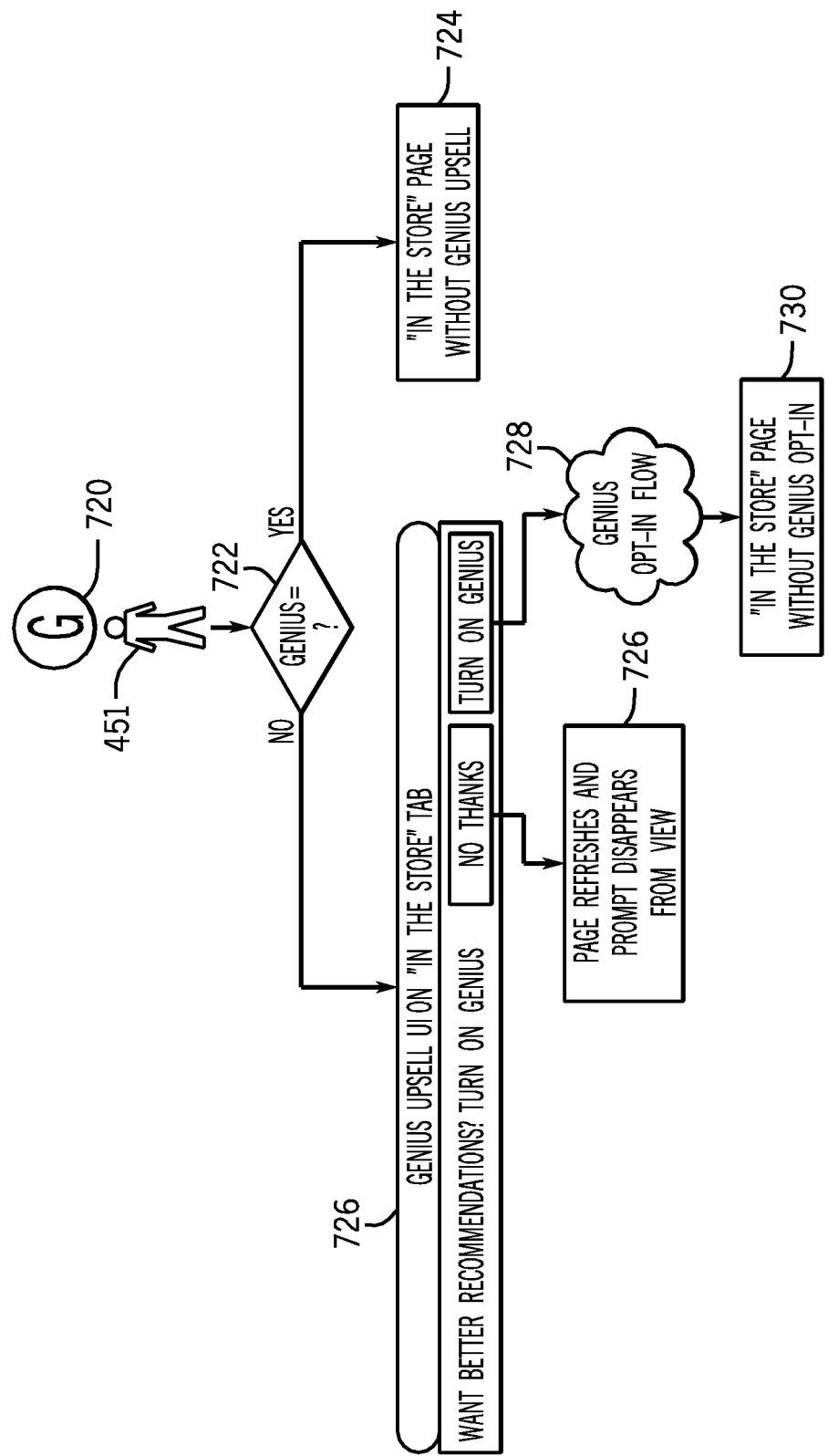

As may be appreciated by FIGS. 19A-F above, the recommendation services 466 may provide more accurate recommendations. Accordingly, FIG. 19G provides an upsell flow 720 designed to encourage the user 451 to activate the recommendation services 466. The system may determine if the recommendation services (e.g., Genius®) 466 is active (decision block 722) when the user clicks the "In the Store" tab or button. If active, the "In the Store" page may appear without providing an upsell prompt (block 724). When the recommendation services 466 are not active, a prompt 726 is provided to the user 451, asking whether the user 451 would like better recommendations. When the user 451 decides not to activate the recommendation services 466, the prompt 726 disappears and the page is refreshed (block 428). When the user 451 decides to turn on the recommendation services 466, an opt-in workflow 728 may follow and the "In the Store" page is provided without the prompt (block 730).

As may be appreciated, by implementing the techniques described herein, graphical user-interfaces used in electronic devices may be greatly enhanced. For example, recommendations for content may be provided to a user in a integrated manner, matching the layout/look and feel of the GUI. This may make the recommendations seem more integral to the GUI (e.g., more integral into the GUI of a content player), thus making the GUI more appealing to the user.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A non-transitory computer-readable storage medium storing one or more programs, the one or more programs comprising instructions, which when executed by an electronic device with a display, cause the electronic device to:
receive a request from a user for content recommendations based on a respective content item in a media library of the user;
gather source information needed to make a content recommendation for the respective content item;
gather graphical user interface information comprising a layout definition of the graphical user interface;
analyze the source information needed to make the content recommendation to determine content that is related to the source information;
generate the content recommendation, wherein the content recommendation comprises the content that is related to the source information in a format that is defined by the graphical user interface information;
provide the content recommendation to a digital content player for display within the digital content player;
display, on the display, a first user interface for the digital content player that includes the content recommendation for the respective media content item, the first user interface including a plurality of media content items, wherein the content recommendation includes:
a first set of recommended media content items that are selected from content that is related to the respective media content item and are selected so as to exclude media content items that have already been added to the media library of the user; and
a second set of recommended media content items different from the first set of recommended content items that are selected from newly released media items and are selected so as to exclude media content items that have already been added to the media library of the user;
detect activation of an action menu icon adjacent to or within a first media content item in the plurality of media content items; and,
in response to detecting activation of the action menu icon adjacent to or within the first media content item:
display an action menu for the first media content item, wherein the action menu includes:
an add icon that when selected enables the first media content item to be added to a playlist within the digital content player; and
a share icon that when selected enables the first media content item to be shared with other electronic devices.

2. The computer-readable storage medium of claim 1, wherein the action menu icon includes a graphic with three geometric shapes.

3. The computer-readable storage medium of claim 1, wherein displaying the action menu for the first media content item includes displaying the action menu adjacent to the action menu icon.

4. The computer-readable storage medium of claim 1, wherein the action menu further includes a list of content recommendations.

5. The computer-readable storage medium of claim 1, wherein the action menu further includes a store icon that when selected accesses an online store.

6. The computer-readable storage medium of claim 4, wherein the list of content recommendations includes only content not found in a content library of the digital content player.

7. The computer-readable storage medium of claim 4, wherein the list of content recommendations includes only content found in a content library of the digital content player.

8. An electronic device, comprising:
a display;
one or more processors;
memory; and
one or more programs, wherein the one or more programs are stored in the memory and configured to be executed by the one or more processors, the one or more programs including instructions for:
receiving a request from a user for content recommendations based on a respective content item in a media library of the user;
gathering source information needed to make a content recommendation for the respective content item;
gathering graphical user interface information comprising a layout definition of the graphical user interface;
analyzing the source information needed to make the content recommendation to determine content that is related to the source information;
generating the content recommendation, wherein the content recommendation comprises the content that is related to the source information in a format that is defined by the graphical user interface information;
providing the content recommendation to a digital content player for display within the digital content player;
displaying, on the display, a first user interface for the digital content player that includes the content recommendation for the respective media content item, the first user interface including a plurality of media content items, wherein the content recommendation includes:
a first set of recommended media content items that are selected from content that is related to the respective media content item and are selected so as to exclude media content items that have already been added to the media library of the user; and
a second set of recommended media content items different from the first set of recommended content items that are selected from newly released media items and are selected so as to exclude media content items that have already been added to the media library of the user;
detecting activation of an action menu icon adjacent to or within a first media content item in the plurality of media content items; and,
in response to detecting activation of the action menu icon adjacent to or within the first media content item:
displaying an action menu for the first media content item, wherein the action menu includes:
an add icon that when selected enables the first media content item to be added to a playlist within the digital content player; and
a share icon that when selected enables the first media content item to be shared with other electronic devices.

9. A method, comprising at an electronic device with a display:
receiving a request from a user for content recommendations based on a respective content item in a media library of the user;
gathering source information needed to make a content recommendation for the respective content item;
gathering graphical user interface information comprising a layout definition of the graphical user interface;

analyzing the source information needed to make the content recommendation to determine content that is related to the source information;

generating the content recommendation, wherein the content recommendation comprises the content that is related to the source information in a format that is defined by the graphical user interface information;

providing the content recommendation to a digital content player for display within the digital content player;

displaying, on the display, a first user interface for the digital content player that includes the content recommendation for the respective media content item, the first user interface including a plurality of media content items, wherein the content recommendation includes:

a first set of recommended media content items that are selected from content that is related to the respective media content item and are selected so as to exclude media content items that have already been added to the media library of the user; and a second set of recommended media content items different from the first set of recommended content items that are selected from newly released media items and are selected so as to exclude media content items that have already been added to the media library of the user;

detecting activation of an action menu icon adjacent to or within a first media content item in the plurality of media content items; and, in response to detecting activation of the action menu icon adjacent to or within the first media content item:

displaying an action menu for the first media content item, wherein the action menu includes:

an add icon that when selected enables the first media content item to be added to a playlist within the digital content player; and a share icon that when selected enables the first media content item to be shared with other electronic devices.

* * * * *